(12) United States Patent
Sasaki

(10) Patent No.: US 7,146,078 B2
(45) Date of Patent: Dec. 5, 2006

(54) OPTICAL WAVEGUIDE DEVICE

(75) Inventor: Kensuke Sasaki, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 21 days.

(21) Appl. No.: 11/159,352

(22) Filed: Jun. 23, 2005

(65) Prior Publication Data

US 2006/0018595 A1    Jan. 26, 2006

(30) Foreign Application Priority Data

Jul. 23, 2004  (JP) .............................. 2004-215423

(51) Int. Cl.
*G02B 6/34* (2006.01)
(52) U.S. Cl. .......................................... 385/37; 385/10
(58) Field of Classification Search ................. 385/10, 385/12, 15, 31, 37
See application file for complete search history.

(56) References Cited

U.S. PATENT DOCUMENTS 6,519,390 B1 * 2/2003 Fells et al. ..................... 385/37
6,614,950 B1 * 9/2003 Huang et al. .................. 385/15

FOREIGN PATENT DOCUMENTS

JP    2005-043771    2/2005

OTHER PUBLICATIONS

Toru Mizunami, "Optical fiber diffraction gratings", Oyo Buturi (Applied Physics), vol. 67, No. 9, 1998, pp. 1029-1033.
Akihiko Nishiki et al, "Development of OCDM Phase Encoder Using SSFBG", Technical Report of IEICE, OFT 2002-66, Nov. 2002, pp. 13-18.
Hideyuki Sotobayashi, "Optical Encoding Division Multiplexing Networks", Oyo Buturi (Applied Physics), vol. 71, No. 7, 2002, pp. 853-859.

* cited by examiner

*Primary Examiner*—Phan Palmer
(74) *Attorney, Agent, or Firm*—Rabin & Berdo, P.C.

(57) ABSTRACT

An FBG encoder as an optical waveguide device includes plural unit FBGs respectively including a periodic refractive index modulation structure in a longitudinal direction of an optical fiber and aligned in the longitudinal direction of the optical fiber; and a phase shift section formed between any two adjacent unit FBGs among the plural unit FBGs, thereby producing a predetermined phase difference between the periodic refractive index modulation structures of two adjacent unit FBGs, wherein the unit FBGs respectively have a structure wherein a period of the periodic refractive index modulation of the plural unit diffraction grating sections gradually increases or decreases in the longitudinal direction of the optical fiber or a structure wherein amplitude of the periodic refractive index modulation is varied relative to the longitudinal direction of the optical fiber so that an envelope of the periodic refractive index modulation is a predetermined window function.

13 Claims, 27 Drawing Sheets

1bit

1bit

1bit

FBG LENGTH (LONGITUDINAL DIRECTION)

1bit

1bit

OPTICAL WAVEGUIDE DEVICE

BACKGROUND OF THE INVENTION

1. Field of the Invention

The present invention relates to an optical waveguide device, such as an optical encoder or an optical decoder including an optical waveguide, in which a Bragg diffraction grating is formed.

2. Description of the Related Art

A fiber Bragg grating (FBG) is a Bragg diffraction grating having a periodic refractive index modulation structure formed in an optical fiber core, and is a filter which reflects light of a specific wavelength. The FBG is made from an optical fiber, and is therefore applied to optical communication devices. FBG are mainly manufactured by the phase mask technique and the Amplitude-Splitting Interferometer technique. The phase mask technique has the advantage that FBG with identical characteristics can be produced with sufficient reproducibility and an ultraviolet radiation laser of low coherence can also be used. The Amplitude-Splitting Interferometer technique has the advantage that the period of the Bragg diffraction grating can be freely set by changing the angle at which the ultraviolet radiation beams split into two are made to interfere, but an ultraviolet radiation laser of high coherence is required. See non-patent document 1, i.e., Toru Mizunami, "Optical fiber diffraction gratings", Applied Physics, Vol. 67, No. 9, 1993, pp. 1029–1033., for example.

An FBG having a phase shift section in a Bragg diffraction grating (SS-FBG: Superstructure-FBG) has also been applied to an OCDM (Optical Code Division Multiplexing) encoder and decoder. See non-patent documents 2, i.e., Akihiko Nishiki et al, "Development of OCDM Phase Encoder Using SSFBG", Technical Report of IEICE, OFT2002-66, November 2002, pp. 13–18, and non-patent documents 3, i.e., Hideyuki Sotobayashi, "Optical Encoding Division Multiplexing Networks", Applied Physics, Vol. 71, No. 7, 2002, pp. 853–859, for example. In the OCDM encoder and decoder, plural phase shift sections are formed at desired positions in the refractive index modulation structure of the FBG. In the encoder and decoder, the number and position of phase shift sections in the refractive index modulation structure of the FBG are determined according to the code length and code pattern.

FIG. 24 is a diagram showing the principle of coding by the encoder (hereafter referred to as "FBG encoder") 310 using SS-FBG and decoding by the decoder (hereafter referred to as "FBG decoder") 320 using SS-FBG. FIG. 24 shows the construction when the FBG encoder 310 or FBG decoder 320 respectively generate a binary phasing signal of code length '4'. The FBG encoder 310 has four FBG units (hereafter referred to as "unit FBG") 311–314, and the FBG decoder 320 has four unit FBGs 321–324. In the unit FBGs 311–314 and 321–324, the relative phases of the diffraction gratings of the unit FBGs are identical (the amount of phase difference is 0), or the relative phases differ by the amount of phase π. In the FBG encoder 310 shown in FIG. 24, the phase of the unit FBG 313 situated third from the left differs relatively from the phases of the other three unit FBGs 311, 312, and 314 by the amount of phase π. In the FBG decoder 320 shown in FIG. 24, the phase of the unit FBG 322 situated second from the left differs relatively from the phases of the other three unit FBGs 321, 323, and 324 by the amount of phase π.

As shown in FIG. 24, when a light pulse 330 is inputted into the FBG encoder 310, and the reflectance of the unit FBG is small, the positions of each unit FBGs 311–314 differ, so four light pulses (hereafter referred to as an "encoded pulse train") 341–344 respectively reflected by the unit FBGs 311–314 arise with a time difference. The four light pulses 341–344 respectively reflected by the unit FBGs 311–314 relatively have an optical phase of 0 or π according to the relative phases of the diffraction gratings of the unit FBGs 311–314. Therefore, the four light pulses 341–344 reflected by the unit FBGs 311–314 shown in FIG. 24 relatively have optical phases of (0, 0, π, 0), respectively. When the light pulses 341–344 of this encoded pulse train enter the FBG decoder 320, four light pulses 341a–341d, 342a–342d, 343a–343d, and 344a–344d reflected by the unit FBGs 321–324 corresponding to each of the light pulses 341–344 arise with a time difference as in the FBG encoder 310 (i.e., a total of 16 light pulses 341a–341d, 342a–342d, 343a–343d, and 344a–344d are generated).

In the FBG decoder 320 shown in FIG. 24, the phase of the diffraction grating of the unit FBG 322, which is second from the left, differs relatively from the phases of the other three diffraction gratings of the unit FBGs 321, 323, and 324. In other words, the phase sequence of the diffraction gratings of the unit FBGs 321–324 of the FBG decoder 320, is opposite to the phase sequence of the diffraction gratings of the unit FBGs 311–314 of the FBG encoder 310. At this time, the code pattern of the FBG encoder 310 and the code pattern of the FBG decoder 320 coincide. The light pulse reflected by the unit FBGs 321–324 of the FBG decoder 320 has an optical phase of (0, π, 0, 0) or (π, 0, π, π), respectively. If some of the 16 light pulses 341a–341d, 342a–342d, 343a–343d, and 344a–344d reflected by the FBG decoder 320 are superimposed and the superimposed light pulses are identical, they reinforce each other, and if the phases are different, they cancel each other out. As shown in FIG. 24, when the code pattern of the FBG encoder 310 and the code pattern of the FBG decoder 320 is the same, the four light pulses 341d, 342c, 343b, and 344a are superimposed and match each other, while at other times, light pulses of the same phase and different phase are superimposed and cancel out, so a light pulse 353 having a high resolution peak is produced at a specific time.

FIGS. 25A and 25B are diagrams showing a refractive index modulation structure 304 of a core 302 of an optical fiber 301 with which an FBG encoder (or FBG decoder) 300 is provided. A diffraction grating formed in the optical fiber core 302 has a periodic refractive index modulation Δn. For a desired reflected wavelength λ, the diffraction grating period Λ is given by the Bragg reflection equation:

$$\lambda = 2 \times n_{eff} \times \Lambda \qquad (1)$$

where $n_{eff}$ is the effective refractive index of the optical fiber.

The refractive index modulation Δn of the FBG encoder 300 shown in FIGS. 25A and 25B has a structure wherein plural phase shift sections 306 are provided depending on the code pattern. The FBG encoder 300 shown in FIGS. 25A and 25B has seven phase shift sections 306.

However, in conventional FBG encoders and FBG decoders, if an input light pulse width is made larger than a time difference (hereafter referred to as a "reflected pulse time difference") of the reflected pulse between adjacent unit FBGs, the reflected pulses of the adjacent unit FBGs will be superimposed, and interference will be caused between the reflected pulses. If the distance between the unit FBGs is 'd', the reflected pulse time difference $T_d$ is given by the equation:

$$T_d = 2 \times d \times n_{eff}/c \quad (2)$$

where 'c' is the velocity of light in a vacuum.

FIGS. 26A to 26D are diagrams showing that interference arises between the reflected pulses of the adjacent unit FBGs when the input light pulse width is larger than the reflected pulse time difference. As shown in FIG. 26A, when a light pulse 360 having a larger pulse width than the reflected pulse time difference $T_d$ of unit FBGs 371 and 372 is inputted into an FBG 370 including the two unit FBGs 371 and 372, a light pulse 372a reflected by the unit FBG 372 adjacent to a light pulse 371a reflected by the unit FBG 371, has a reflected pulse time difference, but as shown in FIG. 26B, parts of the two reflected pulses 371a and 372a overlap. When the reflected pulses 371a and 372a have a different phase, a distortion of the light pulse shown in FIG. 26C occurs, and if they have the same phase, the light pulses combine as shown in FIG. 26D. In other words, in the conventional FBG encoder, when the input light pulse width is larger than the reflected pulse time difference $T_d$, the generated encoded pulse train collapses.

Further, FIG. 27 is a diagram showing a graph of the relation between the input light pulse width and the bandwidth of a unit FBG, and the relation between the reflected pulse time difference and the bandwidth, when the input light pulse width is smaller than the reflected pulse time difference $T_d$. As shown in the graph of FIG. 27, when the input light pulse width is smaller than the reflected pulse time difference, the input light pulse bandwidth is larger than the filter bandwidth of the unit FBG. The reflected light pulse width due to the unit FBG therefore spreads out, the reflected pulses of adjacent unit FBGs overlap, interference between light pulses occurs, and in the FBG encoder, the encoded pulse train collapses.

Therefore, whether the input light pulse width is larger or smaller than the reflected pulse time difference, interference arises between the light pulses of the encoded pulse train generated by the conventional optical encoder, and the reproducibility of the light pulses decoded from the conventional FBG decoder deteriorates.

SUMMARY OF THE INVENTION

It is therefore an object of the present invention, which was conceived to solve the above problems inherent in the conventional described above, to provide an optical waveguide device which can suppress interference between the light pulses of an encoded pulse train by suppressing broadening of the reflected pulse width by broadening the filter bandwidth.

An optical waveguide device of the present invention includes an optical waveguide, in which a Bragg reflection type refractive index modulation structure is formed. The optical waveguide includes plural unit diffraction grating sections respectively including a periodic refractive index modulation structure in a longitudinal direction of the optical waveguide and aligned in the longitudinal direction of the optical waveguide; and one or plural phase shift sections formed between any two adjacent unit diffraction grating sections among the plural unit diffraction grating sections, thereby producing a predetermined phase difference between the periodic refractive index modulation structures of the any two adjacent unit diffraction grating sections, wherein a period of the periodic refractive index modulation of the plural unit diffraction grating sections gradually increases or decreases in the longitudinal direction of the optical waveguide.

An optical waveguide device of the present invention includes an optical waveguide, in which a Bragg reflection type refractive index modulation structure is formed. The optical waveguide includes plural unit diffraction grating sections respectively including a periodic refractive index modulation structure in a longitudinal direction of the optical waveguide and aligned in the longitudinal direction of the optical waveguide; and one or plural phase shift sections formed between any two adjacent unit diffraction grating sections among the plural unit diffraction grating sections, thereby producing a predetermined phase difference between the periodic refractive index modulation structures of the any two adjacent unit diffraction grating sections, wherein amplitude of the periodic refractive index modulation of the plural unit diffraction grating sections, the periodic refractive index modulation being drawn in a coordinate system including the longitudinal direction and refractive index of the optical waveguide as coordinate axes, is varied relative to the longitudinal direction of the optical waveguide so that an envelope of the periodic refractive index modulation is a predetermined window function.

According to the optical waveguide device of the present invention, interference between the light pulses of the generated pulse train can be suppressed by suppressing broadening of the reflected pulse width, by adopting a structure which broadens the filter bandwidth. When the optical waveguide device of the present invention is applied to an optical encoder and an optical decoder, interference between the light pulses of the encoded pulse train generated by the optical encoder can be suppressed, and the reproducibility of the light pulse decoded by the optical decoder can thus be improved.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5A to 5C are diagrams for describing the effect of the first embodiment of the present invention, wherein FIG. 5A shows an input pulse, FIG. 5B shows a decoded waveform obtained as a result of encoding with the conventional FBG encoder and decoding with the conventional FBG decoder, and FIG. 5C shows a decoded waveform obtained as a result of encoding an optical signal of pulse width 10 ps with the FBG encoder of the first embodiment and decoding it with the FBG decoder of the first embodiment;

FIGS. 13A and 13B are diagrams showing a method of manufacturing an FBG, wherein FIG. 13A shows a step for forming a refractive index modulation structure before a phase mask shift, and FIG. 13B shows a step for forming a refractive index modulation structure after a phase mask shift;

FIGS. 17A to 17C are diagrams showing a method of manufacturing an FBG, wherein FIG. 17A is a diagram showing a vibration of a phase mask, FIG. 17B is a diagram showing that amplitude of the refractive index modulation of an optical fiber core becomes large when the vibration amplitude of the phase mask is small, FIG. 17C is a diagram showing that amplitude of the refractive index modulation of the optical fiber core becomes small when the vibration amplitude of the phase mask is large;

FIGS. 19A and 19B are diagrams for describing a method of forming apodization, wherein FIG. 19A shows the input voltage waveform of the piezo-electric element of the slight displacement stage, and FIG. 19B shows the refractive index modulation amplitude of the optical fiber core;

FIGS. 21A to 21D are diagrams for describing a method of manufacturing an FBG, wherein FIG. 21A shows the operation of a drive circuit (combining circuit) of the piezo-electric element of the slight displacement stage, FIG. 21B shows an example of an input signal waveform from a function signal generator, FIG. 21C shows an example of an input voltage waveform from a direct current voltage generator, and FIG. 21D shows the output waveform of the combining circuit;

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

(1) FIRST EMBODIMENT

Figure 1A:
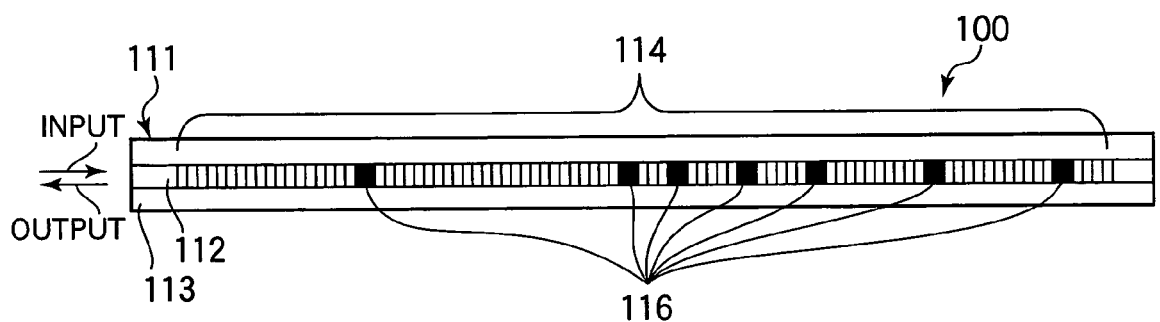
FIGS. 1A to 1C are diagrams showing an FBG encoder (or FBG decoder) in accordance with a first embodiment of the present invention.
Figure 1B:
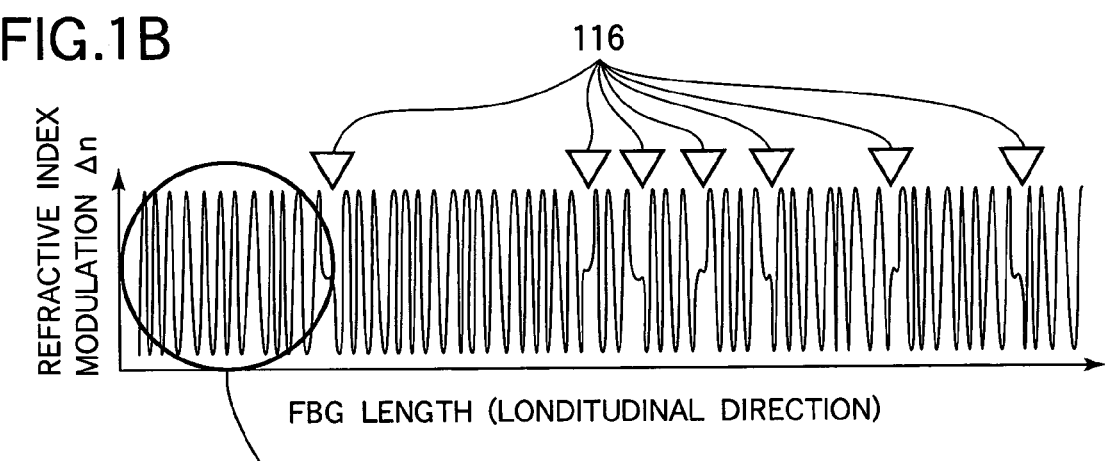
Figure 1C:
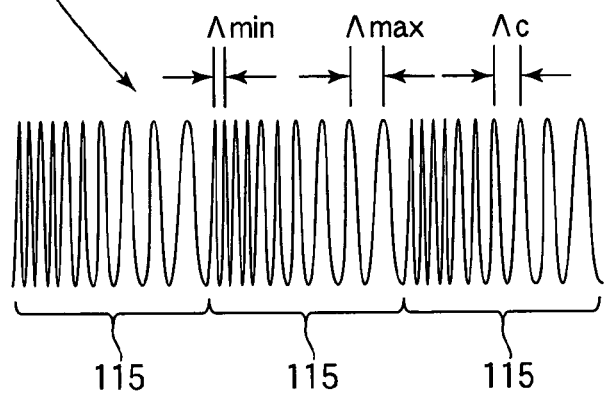

FIGS. 1A to 1C are diagrams showing an FBG encoder (or FBG decoder) 100 which is an optical waveguide device in accordance with a first embodiment of the present invention. FIG. 1A shows a refractive index modulation structure 114 and a phase shift section 116 of a core (i.e., an optical fiber core) 112 of an optical fiber 111 of the FBG encoder 100. FIG. 1B shows a refractive index modulation Δn in the optical fiber core 112 shown in FIG. 1A. FIG. 1C is an enlargement of part of FIG. 1B. As shown in FIGS. 1A to 1C, the FBG encoder 100 includes an optical fiber 111 which is an optical waveguide, this optical fiber 111 having an optical fiber core 112, in which a Bragg reflection type refractive index modulation structure is formed, and a clad 113 around the optical fiber core 112.

As shown in FIGS. 1A to 1C, the optical fiber core 112 has plural unit FBGs (unit diffraction grating sections) 115 which each have a periodic refractive index modulation structure 114 in the longitudinal direction ((horizontal direction in FIGS. 1A to 1C) of the optical fiber 111, and are aligned in the longitudinal direction of the optical fiber 111. The optical fiber core 112 is formed between any two adjacent unit FBGs of the plural unit FBGs 115. There are one or more phase shift sections 116 (seven sections in FIGS. 1A and 1B) which produce a predetermined phase difference in the refractive index modulation structure of these two adjacent unit FBGs 115. In the first embodiment, the plural unit FBGs have a structure (i.e., chirp structure) wherein the period of the periodic refractive index modulation gradually increases or decreases in the longitudinal direction of the optical fiber 111.

In FIGS. 1A to 1C, the FBG encoder 100 reflects an input light pulse to give a light pulse which is encoded with a code length of '15' and binary phase. The FBG encoder 100 shown in FIG. 1A has a periodic diffraction grating formed in the core 112 of the optical fiber 111. In the refractive index modulation structure of the unit FBGs 115 shown in FIG. 1C, the refractive index modulation period A of the diffraction grating which conforms to the Bragg reflection equation $\lambda = 2 \times n_{eff} \times \Lambda$ A gradually increases from a minimum period $\Lambda_{min}$ to a maximum period $\Lambda_{max}$ in the longitudinal direction of the optical fiber (hereafter referred to as "chirp"). $n_{eff}$ is the effective refractive index. In the first embodiment, all the unit FBGs 115 have the same chirp structure. A phase shift section 116 is also provided between the unit FBGs 115 according to the light pulse code, and the shift amount due to one phase shift section 116 is set to ½ of the refractive index modulation period $\Lambda_c$ at the midpoint of the longitudinal direction of the unit FBG 115.

Figure 2:
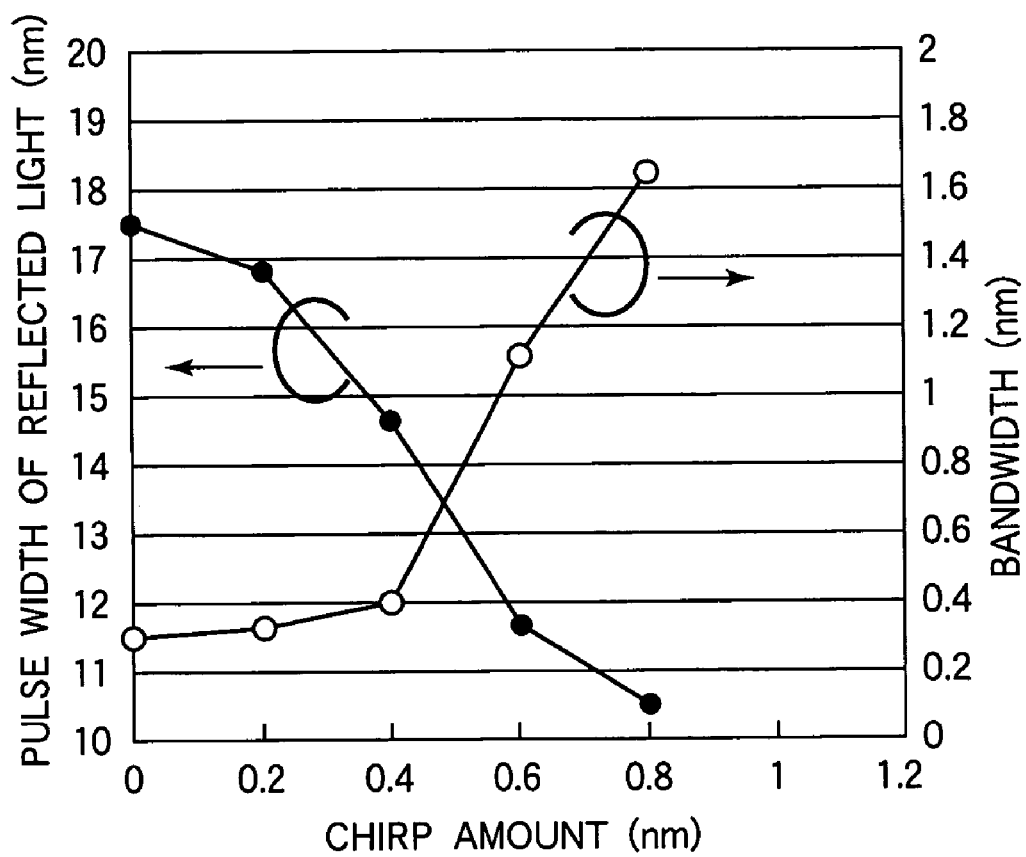
FIG. 2 is a diagram showing a graph of the relation between the chirp amount and bandwidth, and the relation between the chirp amount and reflected pulse width, of a unit FBG.

FIG. 2 is a diagram showing a graph of the relation between the chirp amount and the bandwidth, and the relation between the chirp amount and pulse width of the reflected light (reflected pulse width), of a unit FBG when the input light pulse width is 10 ps. The unit FBG having the properties shown in the graph of FIG. 2 is approximately 2.4 mm in length, and the chirp of the refractive index modulation varies from a minimum period $\Lambda_{min}$ to a maximum period $\Lambda_{max}$ as a linear function to length. Let {"the total variation of the refractive index modulation period of the unit FBG"×2 ×$n_{eff}$} be the "chirp amount." As shown in FIG. 2, the filter bandwidth (units: nm) of the unit FBG can be adjusted by the chirp amount (unit: nm) of the unit FBG, and the broadening of the reflected pulse width (unit: nm) is more suppressed, the larger the chirp amount is. In other words, if the filter bandwidth of the unit FBG is adjusted by determining the chirp amount of the unit FBG according to the pulse width of the input light (i.e., by using a unit FBG having a chirp amount according to the pulse width of the input light), the broadening of the reflected pulse width can be suppressed.

Figure 3:
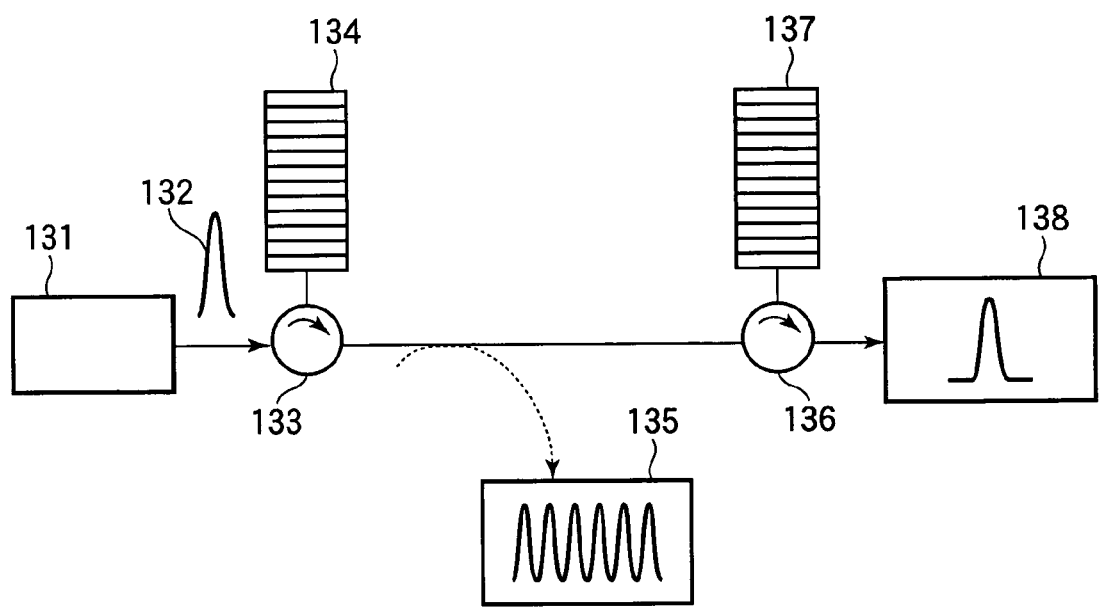
FIG. 3 is a diagram showing an outline of a measurement system for observing an encoded pulse train and a decoded waveform to evaluate the function of the FBG encoder (or FBG decoder) in accordance with the first and second embodiments of the present invention.

FIG. 3 is a diagram showing an outline of a measurement system for observing an encoded pulse train and a decoded waveform to evaluate the function of the FBG encoder (or FBG decoder) in accordance with the present invention (first and second embodiments). In the measurement system shown in FIG. 3, light pulses 132 of 1.25 GHz are continuously generated by a light pulse generator 131. The pulse width of the light pulse 132 is 10 ps. The light pulse 132 is inputted into an FBG encoder 134 via an optical circulator 133. The reflected light from an FBG encoder 134 is outputted via the optical circulator 133, and the encoded pulse train is observed with an oscilloscope 135. The encoded pulse train outputted via the optical circulator 133 is inputted into an FBG decoder 137 via an optical circulator 136. The reflected light from the FBG decoder 137 is outputted via the optical circulator 136, and the decoded waveform is observed with an oscilloscope 138.

Figure 4A:
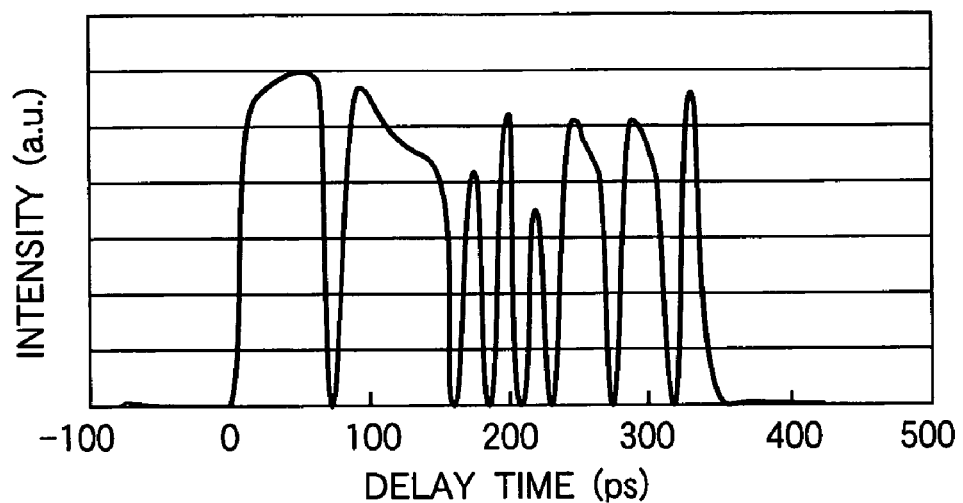
FIG. 4A shows an encoded pulse train generated by a conventional FBG encoder.
Figure 4B:
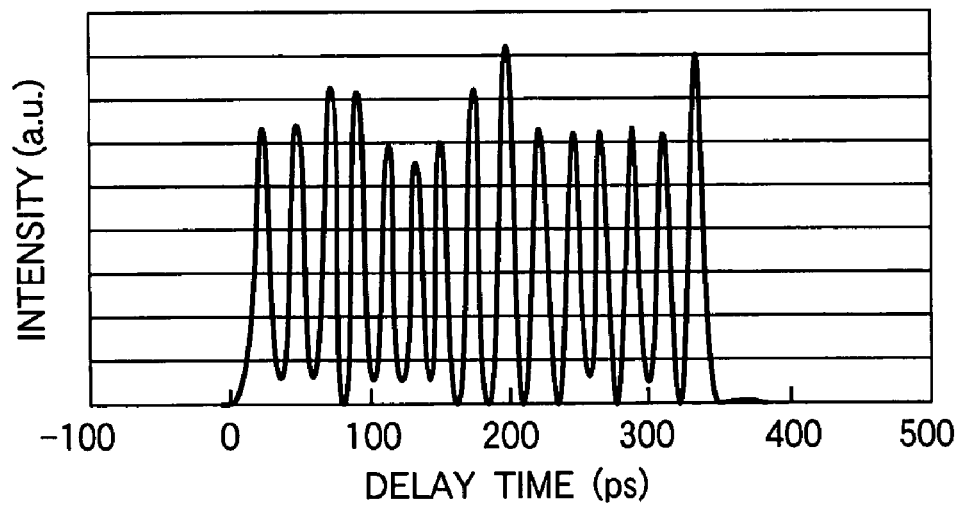
FIG. 4B shows an encoded pulse train generated by the FBG encoder in accordance with the first embodiment of the present invention.
Figure 25A:
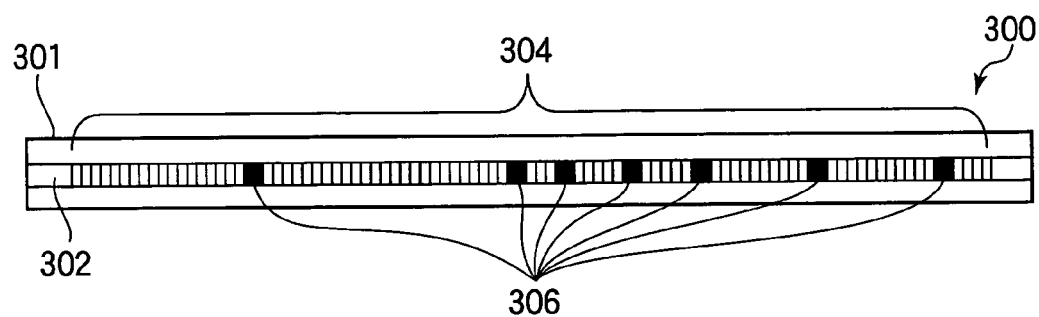
FIGS. 25A and 25B are diagrams showing the refractive index modulation structure of the optical fiber core of a conventional FBG encoder or a conventional FBG decoder.
Figure 25B:
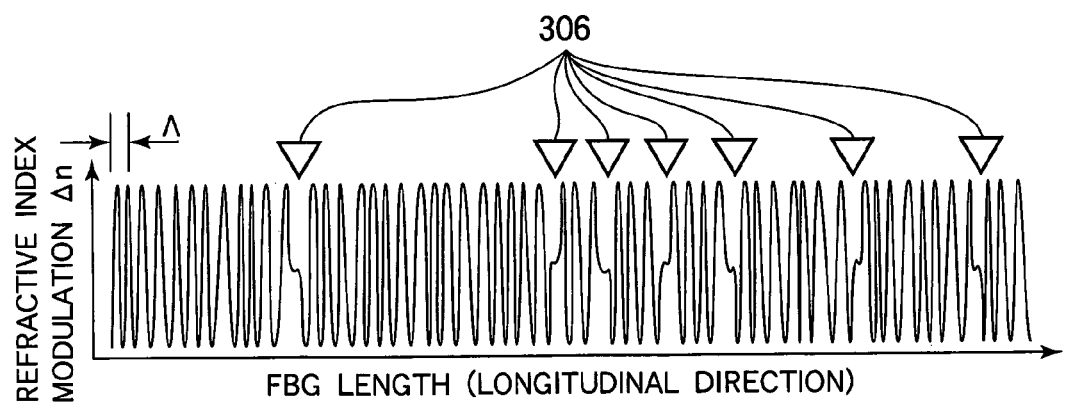
Figure 26A:
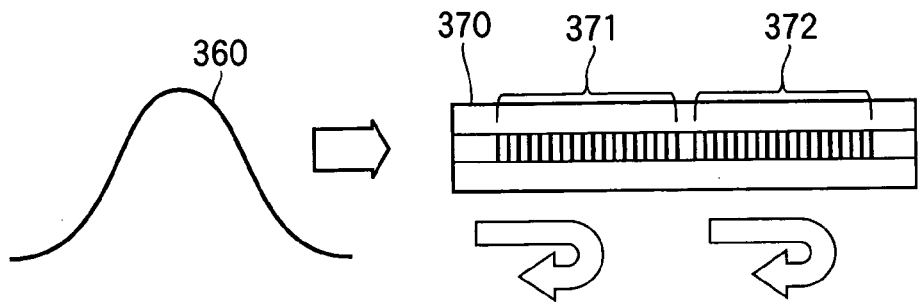
FIGS. 26A to 26D are diagrams showing that an interference pulse arises between the reflected pulses of adjacent unit FBGs when the input light pulse width is larger than the reflected pulse time difference.
Figure 26B:
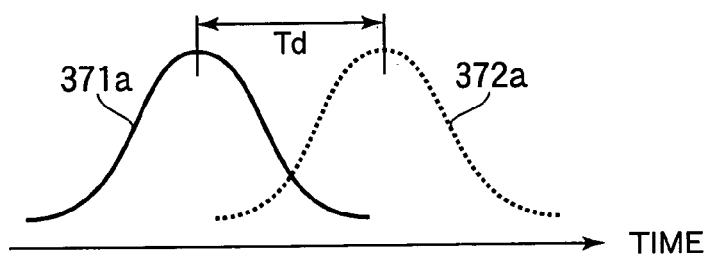
Figure 26C:
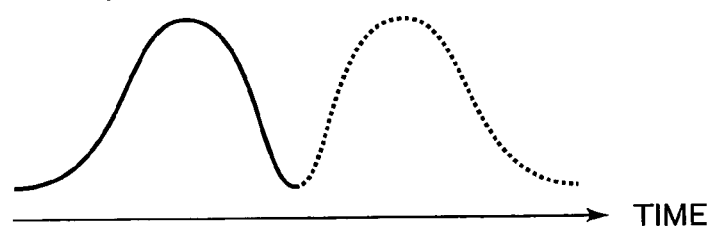
Figure 26D:
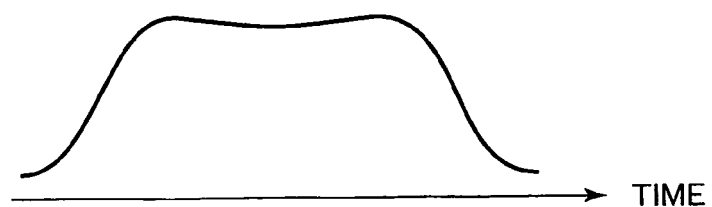
Figure 27:
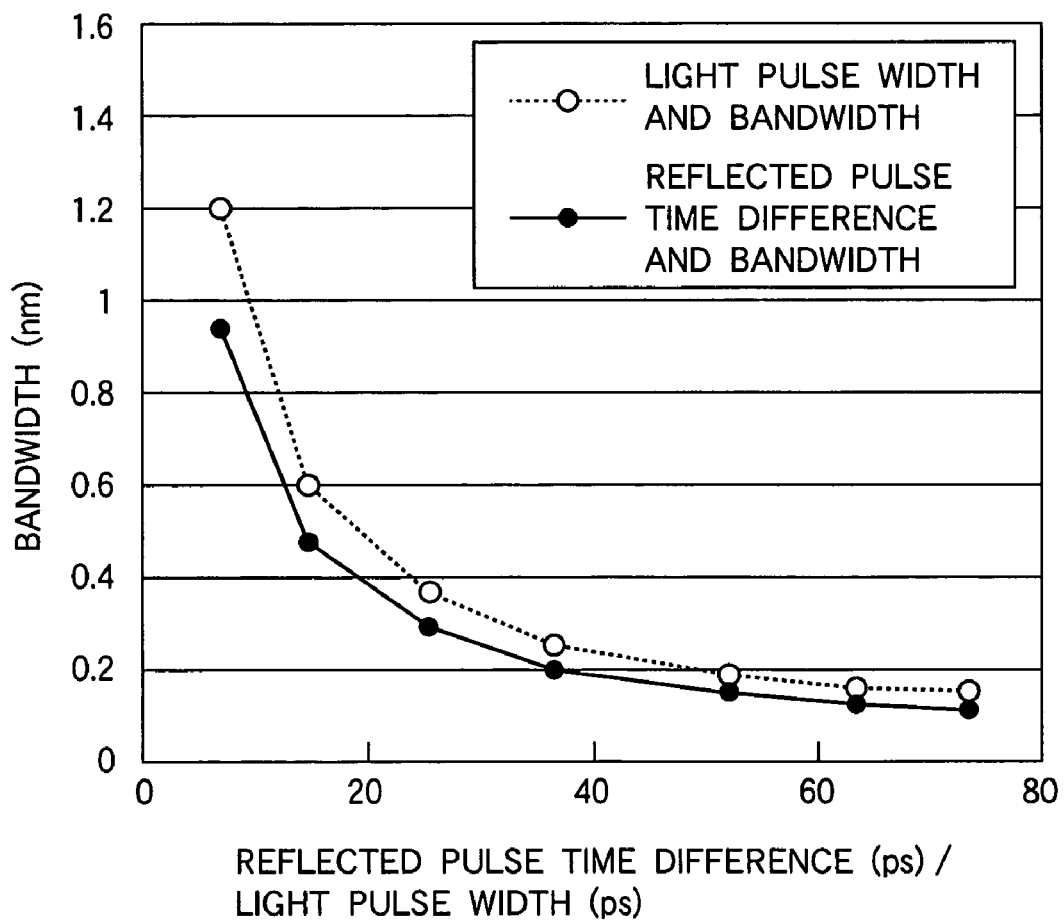
FIG. 27 is a diagram showing the graph of the relation between an input light pulse width and bandwidth, and the relation between a reflected pulse time difference and bandwidth, of a unit FBG when the input light pulse width is smaller than the reflected pulse time difference.

FIG. 4A is a diagram showing the encoded pulse train of the FBG encoder (FIGS. 25A and 25B) of the conventional construction, and the encoded pulse train of the FBG encoder (FIGS. 1A to 1C) 100 of the first embodiment, observed by the measurement system of FIG. 3. Regarding the specification of these FBG encoders, the code length was '15', the length of a unit FBG (unit FBG length) was 2.4 mm, and the refractive index modulation period Λ (conventional example) and the refractive index modulation period $\Lambda_c$ at the midpoint in the longitudinal direction (first embodiment) of the unit FBG was approximately 540 nm. The chirp amount of the unit FBG 115 of the FBG encoder 100 of the first embodiment was set to 0.8 nm. The pulse interval from the light pulse generator 131 in the measurement system of FIG. 3 was 1.25 GHz, and the pulse width of this light pulse was 10 ps. As shown in FIG. 4A, for the encoded pulse train generated by the FBG encoder of the conventional shown in FIG. 25A, overlapping of light pulses occurred between light pulses of the same phase, and a waveform wherein adjoining light pulses were combined, was observed. On the other hand, as shown in FIG. 4B, for the encoded pulse train generated by the FBG encoder 100 of the first embodiment shown in FIG. 1A, broadening of the light pulse was suppressed, and a waveform wherein each light pulse of the encoded pulse train could be clearly distinguished, was observed.

Figure 5A:
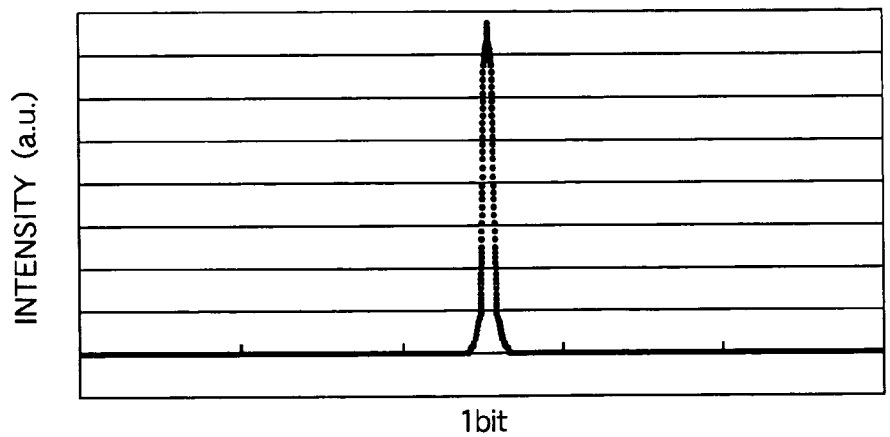
Figure 5B:
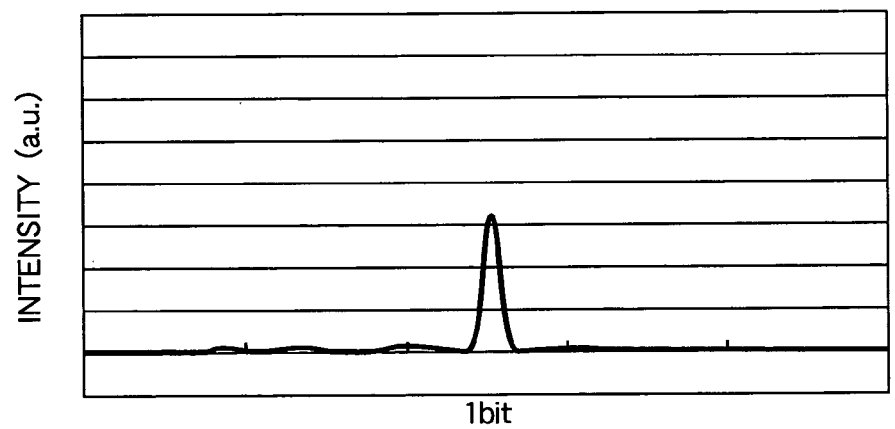
Figure 5C:
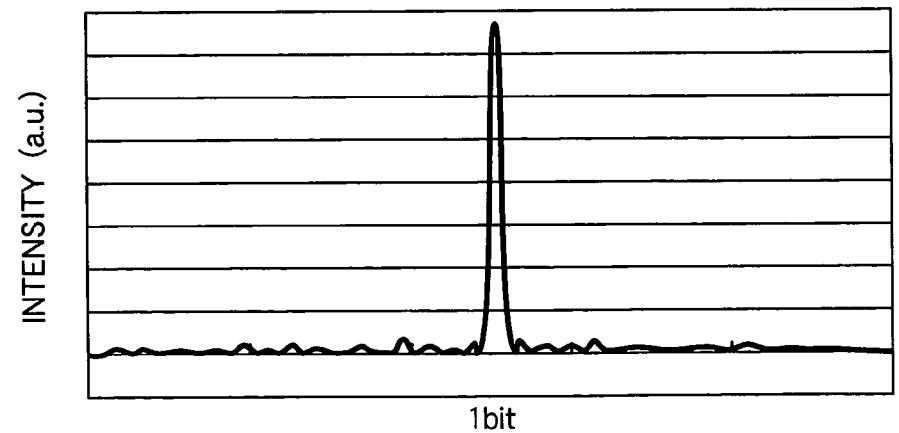

FIGS. 5A to 5C are diagrams for describing the effect of the first embodiment. FIG. 5A shows an input pulse of pulse width (10 ps), FIG. 5B shows the decoded waveform obtained as a result of encoding with the conventional FBG encoder and decoding with the conventional FBG decoder, and FIG. 5C shows the decoded waveform obtained as a result of encoding an optical signal of pulse width 10 ps with the FBG encoder of the first embodiment, and decoding it with the FBG decoder of the first embodiment. From a comparison of FIG. 5B and FIG. 5C, broadening (increase in pulse width and decrease in pulse intensity) is observed in the pulse waveform which was encoded by the conventional FBG encoder and decoded by the conventional FBG decoder. However, broadening (increase in pulse width and decrease in pulse intensity) is not observed in the pulse waveform which was encoded by the FBG encoder of the first embodiment of the present invention, and decoded by the FBG decoder of the first embodiment. Hence, it was found that by using the FBG encoder and FBG decoder in accordance with the first embodiment, a waveform (FIG. 5C) equivalent to the input pulse of FIG. 5A could be restored, and reproducibility was satisfactory.

In the aforesaid description, the case was described where the chirp amount was made to increase in the longitudinal direction of the optical fiber, but a construction may be adopted wherein the chirp amount of the unit FBG is made to decrease in the longitudinal direction of the optical fiber.

(2) SECOND EMBODIMENT

Figure 6A:
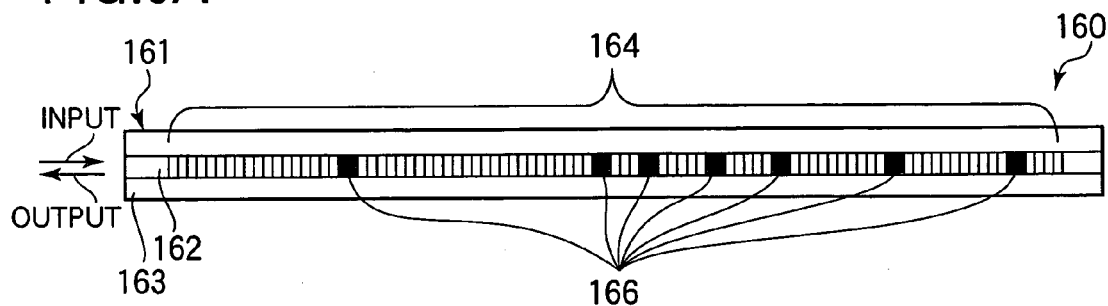
FIGS. 6A to 6C are diagrams showing an FBG encoder (or FBG decoder) in accordance with a second embodiment of the present invention.
Figure 6B:
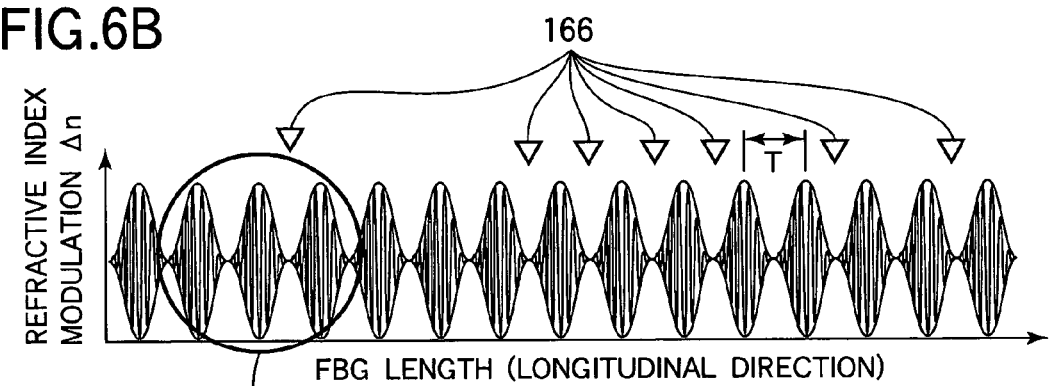
Figure 6C:
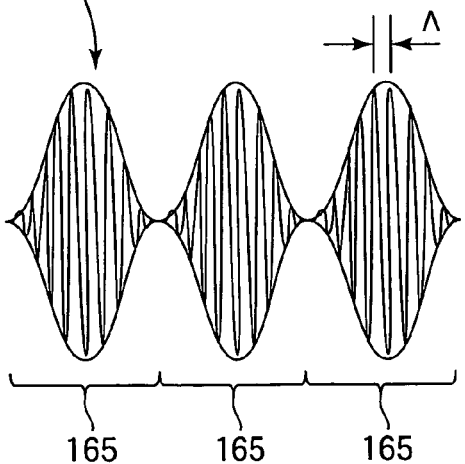

FIGS. 6A to 6C are diagrams showing an FBG encoder (or FBG decoder) 160 which is an optical waveguide device in accordance with the second embodiment of the present invention. FIG. 6A shows a refractive index modulation structure 164 and phase shift sections 166 of a core 162 of an optical fiber 161 of an FBG encoder 160, FIG. 6B shows a refractive index modulation Δn in the optical fiber core 162 shown in FIG. 6A, and FIG. 6C is an enlargement of part of FIG. 6B. As shown in FIGS. 6A to 6C, the FBG encoder 160 includes an optical fiber 161 which is an optical waveguide, and this optical fiber 161 has an optical fiber core 162 wherein a Bragg reflection type refractive index modulation structure is formed, and a clad 163 around the optical fiber core 162.

As shown in FIGS. 6A to 6C, the optical fiber core 162 has plural unit FBGs (unit diffraction grating sections) 165 which each have a periodic refractive index modulation structure 164 in the longitudinal direction ((horizontal direction in FIGS. 6A to 6C) of the optical fiber 161, and are aligned in the longitudinal direction of the optical fiber 161. The optical fiber core 162 includes one or more phase shift sections 166 (seven sections in FIGS. 6A and 6B) which are formed between any two adjacent unit FBGs of the plural unit FBGs 165 and produce a predetermined phase difference in the refractive index modulation structure of these two adjacent unit FBGs 165. As shown in FIGS. 6B and 6C, in the second embodiment, the plural unit FBGs 165 have a construction wherein the periodic refractive index modulation amplitude, when the periodic refractive index modulation is drawn in a coordinate system wherein the longitudinal direction and the refractive index of the optical fiber 160 are taken as coordinate axes, is made to vary with respect to the longitudinal direction of the optical fiber 160 so that the envelope of the periodic refractive index modulation is a predetermined window function.

In FIGS. 6A to 6C, the FBG encoder 160 reflects an input light pulse to give a light pulse which is encoded with a code length of '15' and binary phase. The FBG encoder 160 shown in FIG. 6A has a periodic diffraction grating formed in the core 162 of the optical fiber 161. The refractive index modulation structure of the unit FBG 165 in FIG. 6C is the refractive index modulation period Λ which conforms to the Bragg reflection equation $\lambda=2 \times n_{eff} \times \Lambda$. In the second embodiment, all the unit FBGs 165 have the same structure. Phase shift sections 166 are also provided between the unit FBGs 165 according to the light pulse code, and the shift amount due to one phase shift section 166 is set to ½ of the refractive index modulation period Λ of the unit FBG 165.

Figure 7A:
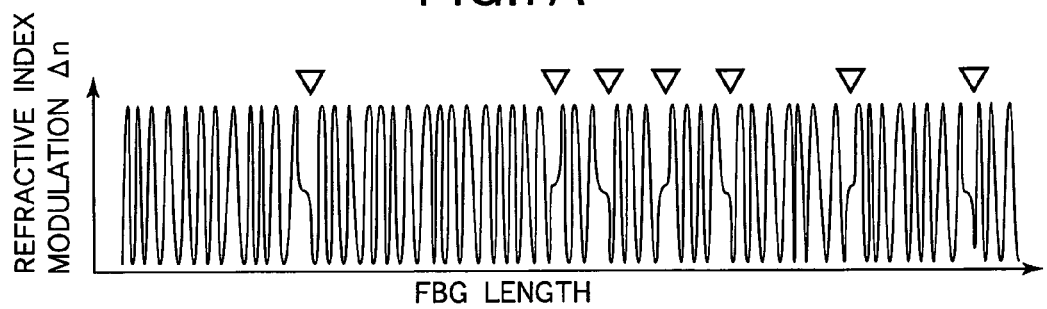
FIGS. 7A to 7C are diagrams for describing the refractive index modulation structure of the FBG encoder (or FBG decoder) in accordance with the second embodiment of the present invention.
Figure 7B:
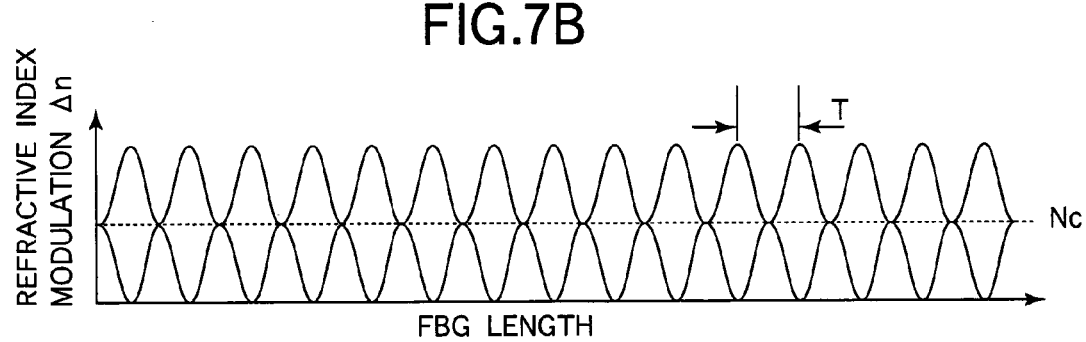
Figure 7C:
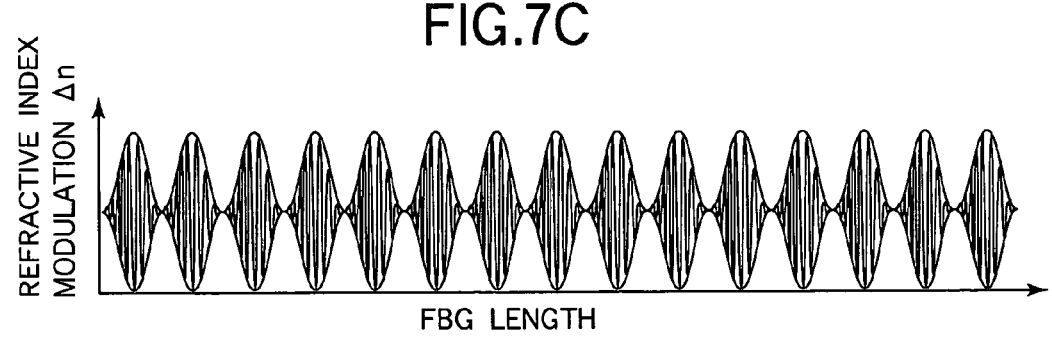

FIGS. 7A to 7C are diagrams for describing the refractive index modulation structure of the unit FBG 165. FIG. 7A shows the same refractive index modulation structure as that of the conventional FBG encoder shown in FIG. 25B. FIG. 7B shows the envelope of the refractive index modulation of the whole FBG encoder having a period T of the unit FBG in the second embodiment. The structure of the FBG encoder of the second embodiment of the present invention is the refractive index modulation structure of FIG. 7C which multiplies the refractive index modulation envelope (can be expressed by a window function) having the period T of the unit FBG of FIG. 7B, by the refractive index modulation of the diffraction grating of FIG. 7A. The window function $n_{unit}$ of the unit FBG of FIG. 7B conforms to the Gaussian function:

$$n_{unit} = \exp\{(-1) \times \mathrm{Ln}(2) \times [2 \times (x - L/2)/(L \times B)]^2\} \quad (3)$$

and is repeated with the period T of the unit FBG. Here, 'L' is the unit FBG length, 'B' is the coefficient (bandwidth coefficient) of the bandwidth adjustment, Ln(.) is the natural logarithm, and exp{.} is an exponential function. As shown in FIG. 7B, the amplitude of this refractive index modulation oscillates around a fixed value Nc as center.

The structure of the FBG encoder of the second embodiment of the present invention has a constant period Λ of refractive index modulation. Since it does not have any change of the refractive index modulation period, production is easy. For example, an FBG encoder can be manufactured using an FBG manufacturing method and manufacturing device shown in an earlier patent application (Japanese Patent Application No. 2003-279518 (Japanese Patent Laid-Open Publication No. 2005-43771 published on Feb. 17, 2005)) filed by the Applicants of the present application who improved the phase mask technique. This FBG manufacturing method and manufacturing device will be described later.

In the above description, an example where a Gaussian function was used for the window function for every unit FBG, was shown, but other signal processing window functions, e.g., a raised cosine function, a tanh (hyperbolic tangent) function, a Blackman function, a Hamming function, and a Hanning function may be used.

Figure 8:
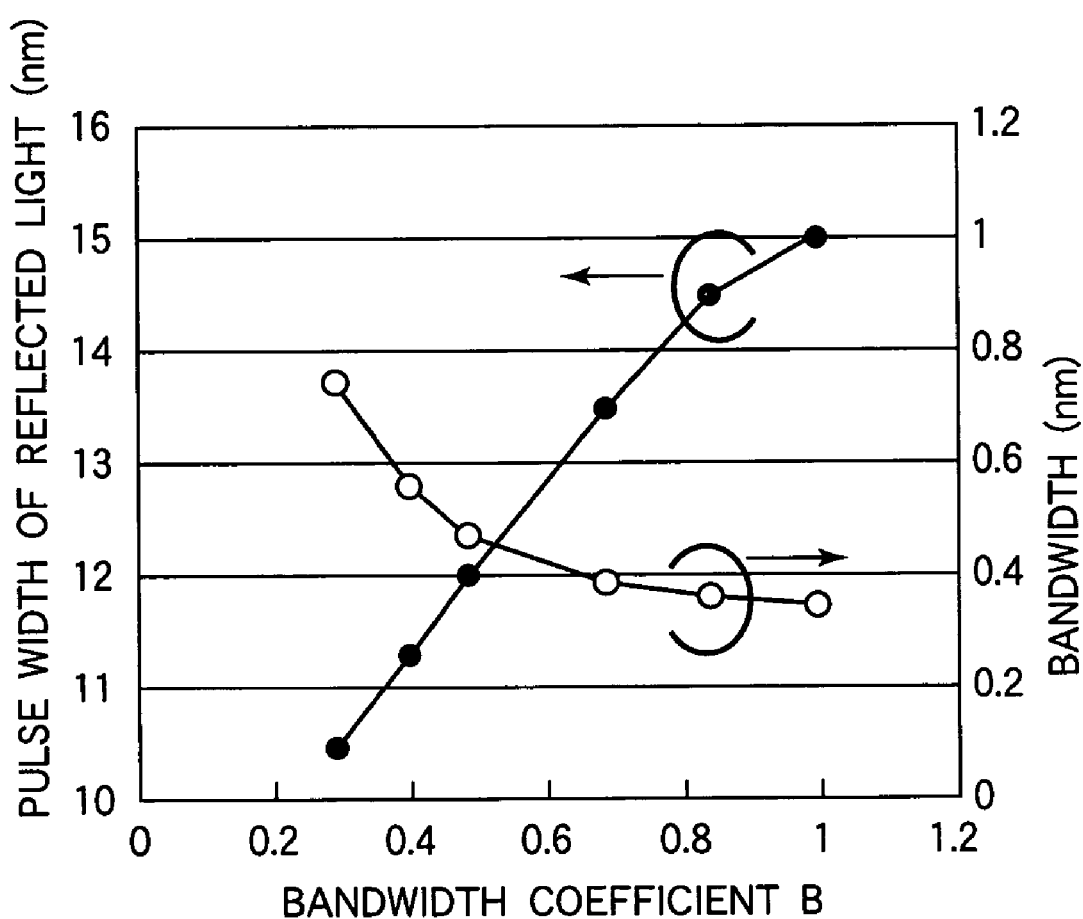
FIG. 8 is a diagram showing a graph of the relation between a bandwidth coefficient and reflected pulse width and the relation between a bandwidth coefficient and a bandwidth, in a Gaussian function expression of a unit FBG.

FIG. 8 is a diagram showing a graph of the relation between the bandwidth coefficient 'B' and reflected pulse width, and the bandwidth coefficient 'B' and the bandwidth, in the Gaussian function expression (3) of the unit FBG for an input light pulse width of 10 ps. The unit FBG having the properties shown in the graph of FIG. 8 is approximately 2.4 mm in length. As shown in FIG. 8, by using the Gaussian function envelope of the unit FBG, compared with the unit FBG (length 2.4 mm, reflected pulse width of approximately 17.5 ps, bandwidth 0.31 nm) of the conventional FBG encoder, the filter bandwidth of the unit FBG can be widened, and the increase in reflected pulse width suppressed. As shown in FIG. 8, when a Gaussian function is used as the window function, the broadening of the reflected pulse width is suppressed, the smaller the bandwidth coefficient 'B' is. Therefore, the filter bandwidth of the FBG encoder can be adjusted by changing the value of the bandwidth coefficient 'B' in equation (3). In other words, if the filter bandwidth of the unit FBG is adjusted by determining the refractive index modulation amplitude of the unit FBG according to the pulse width of the input light (i.e., by using a unit FBG having a refractive index modulation amplitude according to the pulse width of the input light), broadening of the pulse width of the reflected light can be suppressed.

Figure 9A:
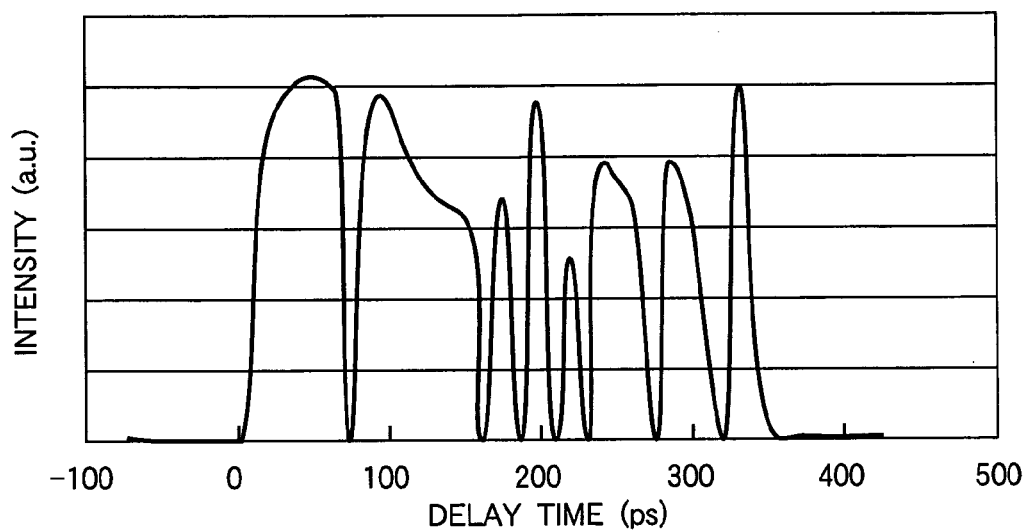
FIG. 9A shows an encoded pulse train generated by the conventional FBG encoder.
Figure 9B:
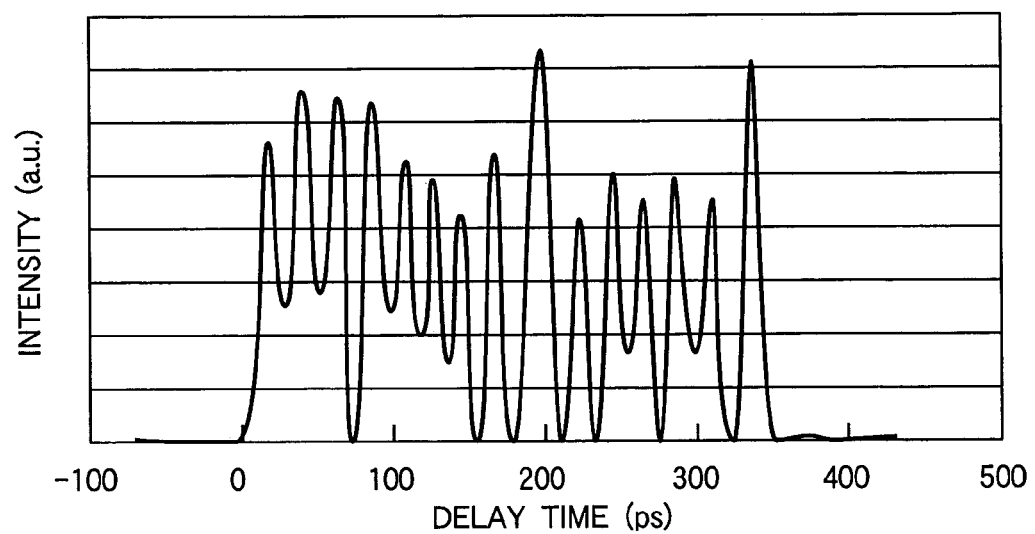
FIG. 9B shows an encoded pulse train generated by the FBG encoder in accordance with the second embodiment of the present invention.

FIG. 9A is a diagram showing an encoded pulse train of the FBG encoder of the conventional construction (FIGS. 25A and 25B), and an encoded pulse train of the FBG encoder 160 of the second embodiment (FIGS. 6A to 6C), observed by the measurement system of FIG. 3. Regarding the specification of these FBG encoders, the code length was '15', length of unit FBG (unit FBG length) was 2.4 mm, and the refractive index modulation period Λ was approximately 540 nm. The bandwidth adjustment factor of the window function was set to 0.5. As shown in FIG. 9A, for the encoded pulse train generated by the FBG encoder of the conventional shown in FIG. 25A, overlapping of light pulses occurred between light pulses of the same phase, and a waveform wherein adjoining light pulses were combined, was observed. On the other hand, as shown in FIG. 9B, for the encoded pulse train generated by the FBG encoder 160 of the second embodiment shown in FIG. 6A, broadening of the light pulse was suppressed, and a waveform wherein each light pulse of the encoded pulse train could be clearly distinguished, was observed.

Figure 10A:
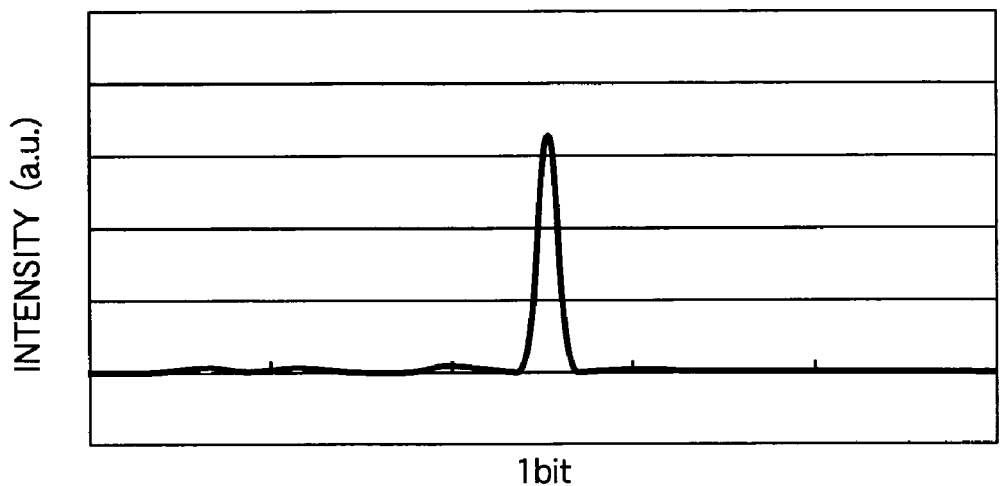
FIG. 10A shows a pulse waveform encoded with the conventional FBG encoder and decoded with the conventional FBG decoder.
Figure 10B:
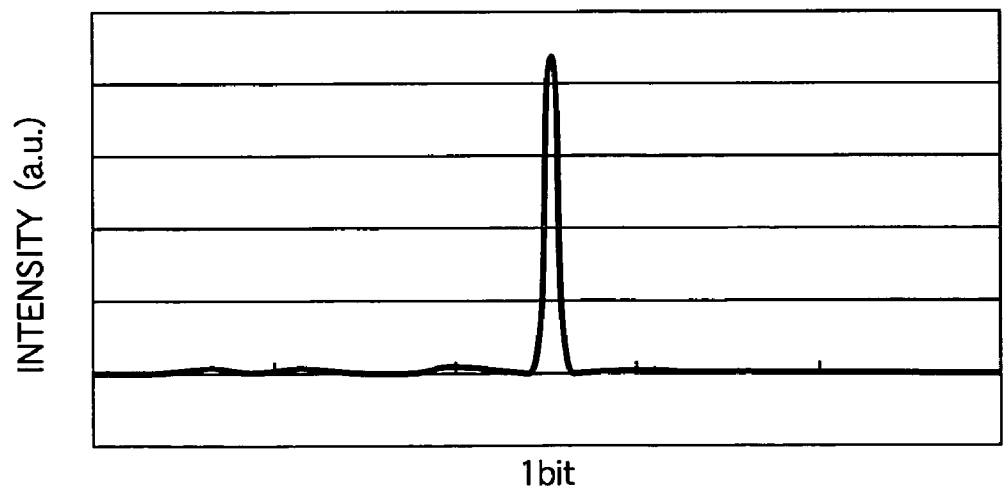
FIG. 10B shows a pulse waveform encoded with the FBG encoder in accordance with the second embodiment and decoded with the FBG decoder in accordance with the second embodiment.

FIGS. 10A to 10C are diagrams for describing the effect of the second embodiment. FIG. 10A shows the decoded waveform obtained as a result of encoding with the conventional FBG encoder and decoding with the conventional FBG decoder, and FIG. 10B shows the decoded waveform obtained as a result of encoding a light signal of pulse width 10 ps with the FBG encoder of the second embodiment, and decoding it with the FBG decoder of the second embodiment. From a comparison of FIG. 10A and FIG. 10B, broadening (increase in pulse width and decrease of pulse intensity) is observed in the pulse waveform encoded by the conventional FBG encoder and decoded by the conventional FBG decoder. However, broadening (increase in pulse width and decrease of pulse intensity) in the pulse waveform encoded by the FBG encoder of the second embodiment of the present invention, and decoded by the FBG decoder of the second embodiment, is small. Hence, it was found that by using the FBG encoder and FBG decoder in accordance with the second embodiment, a waveform equivalent to the input pulse could be restored, and reproducibility was satisfactory.

Figure 11A:
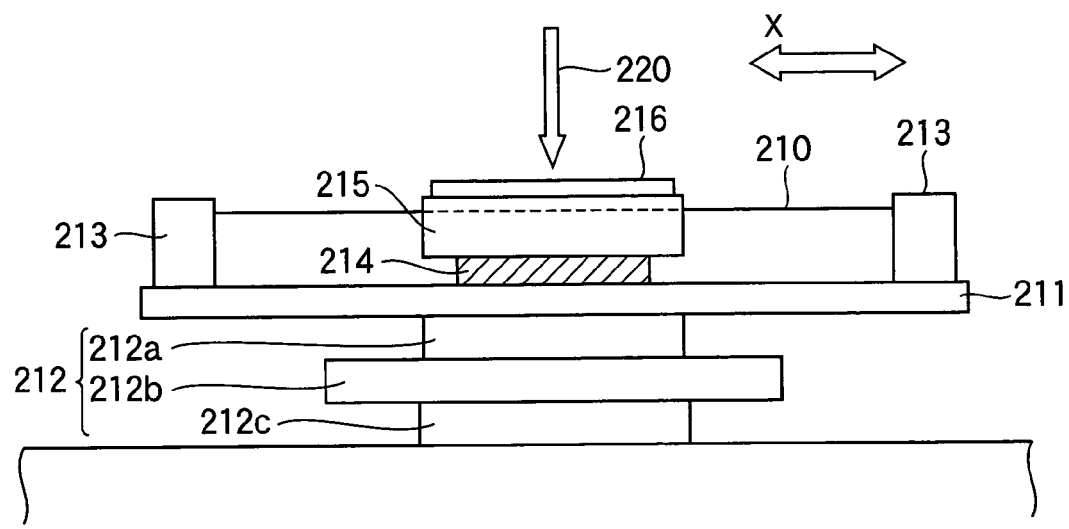
FIGS. 11A and 11B are diagrams schematically showing the construction of an FBG manufacturing device, wherein the X-axis, which is the longitudinal direction of an optical fiber, is taken as the horizontal direction in FIG. 11A, and the Y-axis, which intersects perpendicularly with the X-axis, is taken as the horizontal direction in FIG. 11B.
Figure 11B:
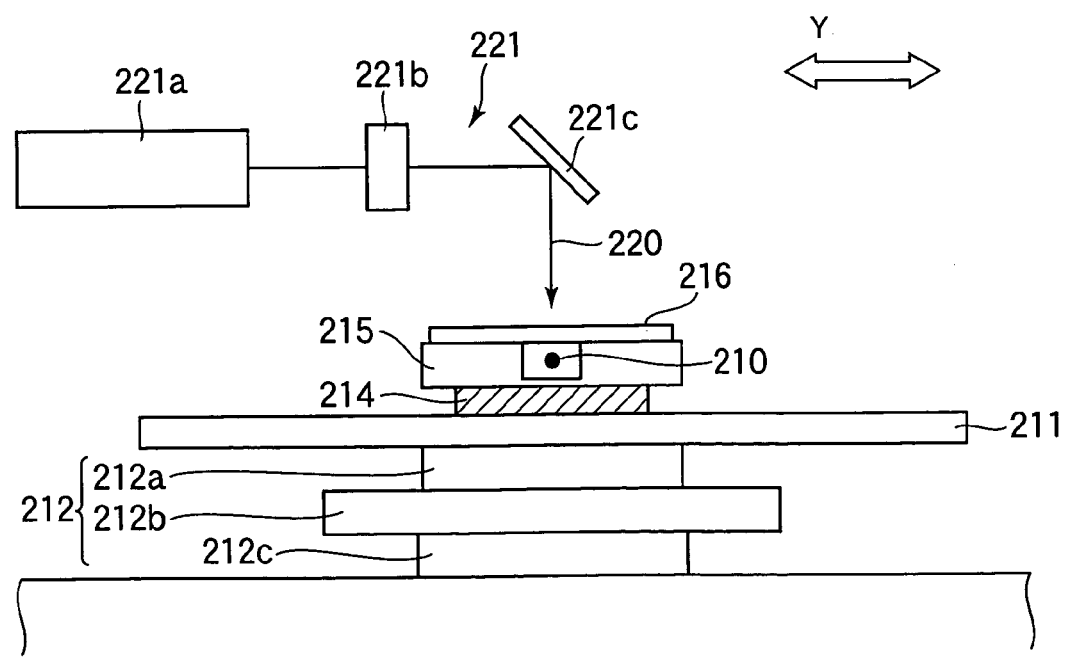

(3) METHOD OF MANUFACTURING FBG LIGHT ENCODER (3-1) Method of Manufacturing an FBG with Phase Shift First and Second Embodiments FIGS. 11A and 11B are diagrams schematically showing the construction of an FBG manufacturing device. FIG. 11A is a diagram wherein the X-axis, which is the longitudinal direction of the optical fiber, is the horizontal direction, and FIG. 11B is a diagram wherein the Y-axis, which intersects perpendicularly with the X-axis, is the horizontal direction. As shown in FIGS. 11A and 11B, the FBG manufacturing device includes a base plate 211, a stage system 212 which displaces or rotates this base plate 211, a fiber holder 213 installed on the base plate 211, a slight displacement stage 214 fixed on the base plate 211, a phase mask holder 215 fixed on this slight displacement stage 214, and a phase mask 216 fixed to this phase mask holder 215. This FBG manufacturing device has an optical system 221 which irradiates an optical fiber 210 stretched in a straight line by the fiber holder 213 with an ultraviolet laser light 220. The optical fiber 210 uses a photosensitive optical fiber wherein the refractive index of the optical fiber core changes with exposure to ultraviolet radiation.

As shown in FIGS. 11A and 11B, the stage system 212 has a θ-axis rotation stage 212a, an Y-axis displacement stage 212b, and an X-axis displacement stage 212c. The θ-axis rotation stage 212a rotates the base plate 211 with a drive force from a drive source such as a pulse motor, not shown, around an axial line (axis extending in the lengthwise direction of FIGS. 11A and 11B, not shown) which intersects perpendicularly with the surface of the base plate 211. The θ-axis rotation stage 212a is used to make the longitudinal direction of the optical fiber 210 held by the fiber holder 213 parallel to the X-axis direction (displacement direction of X-axis displacement stage 12c). The Y-axis displacement stage 212b displaces the θ-axis rotation stage 212a and base plate 211 in the Y-axis direction (displacement direction of Y-axis displacement stage 212b, which is the horizontal direction in FIG. 11B) which intersects perpendicularly with the X-axis direction due to a drive force from a drive source such as a pulse motor, not shown. The Y-axis displacement stage 212b displaces the θ-axis rotation stage 212a and base plate 211 in the Y-axis direction so that the position of the optical fiber core of the optical fiber 210 held by the fiber holder 213 coincides with the irradiation position of the ultraviolet laser light 220. The procedure for adjusting the direction of the optical fiber 210 by the θ-axis rotation stage 212a and the procedure for adjusting the position in the Y-axis direction of the optical fiber 210 by the Y-axis displacement stage 212b are not particularly limited.

The X-axis displacement stage 212c displaces the Y-axis displacement stage 212b, θ-axis rotation stage 212a and base plate 211 in the X-axis direction (horizontal direction in FIG. 11A) due to a drive force from a drive source such as a pulse motor, not shown. The maximum travel distance of the axial displacement stage 212c is, for example, 150 mm, and the positional displacement resolution is, for example, 1 µm. The X-axis displacement stage 212c, by displacing the optical fiber 210 held by the fiber holder 213 on the base plate 211 in its longitudinal direction (coincides with the X-axis direction due to the θ-axis rotation stage 212a and Y-axis displacement stage 212b), displaces the irradiation position of the ultraviolet laser light 220 on the optical fiber 210 in the X-axis direction (i.e., the optical fiber core of the optical fiber 210 is scanned by the ultraviolet laser light 220).

The slight displacement stage 214 on the base plate 211 has a piezo-electric element (PZT) as the drive source, and slightly displaces or vibrates the phase mask holder 215 and phase mask 216 in the X-axis direction. The maximum travel distance of the slight displacement stage 214 is, for example, 35 µm, and the positional displacement resolution is, for example, 1 nm. The slight displacement stage 214 using the piezo-electric element having a positional displacement resolution of 1 nm is suitable for giving a change of the phase shift section or the refractive index modulation amplitude to the Bragg diffraction grating of the optical fiber core 210a. The displacement amount of the piezo-electric element can be adjusted by controlling the input voltage of the piezo-electric element.

The operation of θ-axis rotation stage 212a, Y-axis displacement stage 212b, X-axis displacement stage 212c and slight displacement stage 214 is controlled by drive circuits, not shown in FIGS. 11A and 11B, based on control signals from a control device such as a personal computer (PC), not shown.

As shown in FIG. 11B, the optical system 221 which irradiates the ultraviolet laser light 220 includes a laser light source 221a, a lens 221b and a mirror 221c. The laser light source 221a is, for example, an Ar—CW laser (e.g., a Coherent INNOVA300Fred (commercial name)) which generates 244 nm wavelength light. The ultraviolet laser light from the laser light source 221a is converged by the lens 221b, reflected by the mirror 221c, passed through the phase mask 216 and irradiated to the optical fiber core of the optical fiber 210. In FIGS. 11A and 11B, the irradiation position of the ultraviolet laser light is fixed, and the scanning of the ultraviolet laser light 220 is performed by displacement of the base plate 211 by the X-axis displacement stage 212c. However, the base plate 211 may be fixed, and the optical system 221 moved in the X-axis direction without moving the base plate 211 in the X-axis direction by the X-axis displacement stage 212c.

Figure 12:
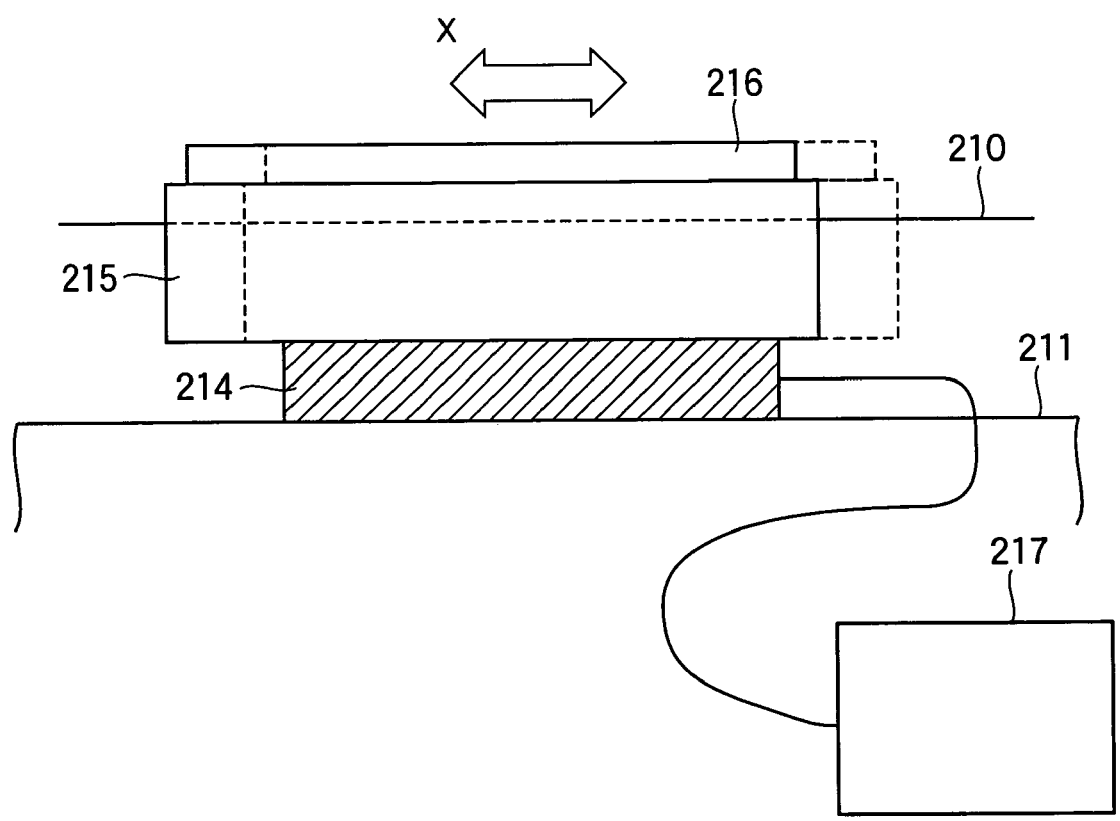
FIG. 12 is a diagram showing the operation of a slight displacement stage of an FBG manufacturing device.

FIG. 12 is a diagram showing the operation of the slight displacement stage 214 of the FBG manufacturing device. The operation of the slight displacement stage 214 is controlled by a drive circuit (direct current voltage generator 217 in FIG. 12) which adjusts the applied voltage of the piezo-electric element of the slight displacement stage 214, based on a control signal from a control device such as a personal computer, not shown. The control device of the stage system 212 and the controlling circuit of the slight displacement stage 214 are usually the same personal computer.

Figure 13A:
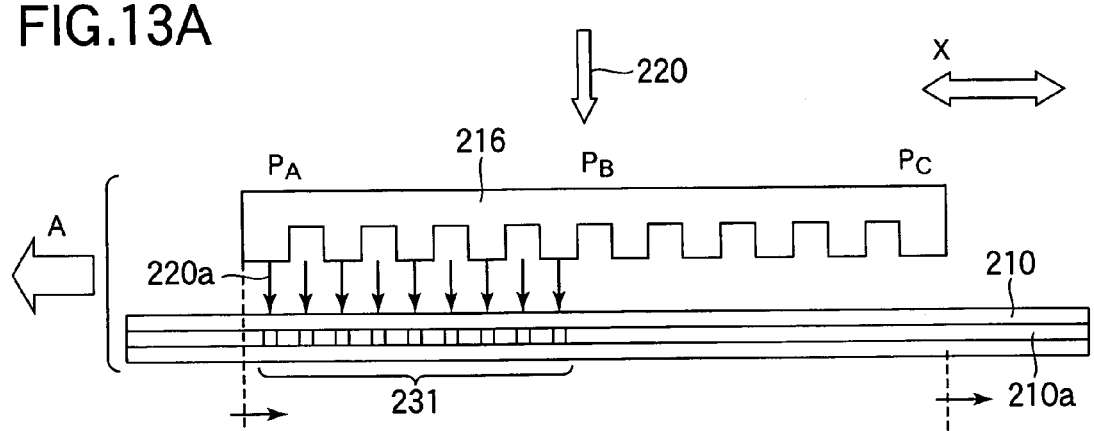
Figure 13B:
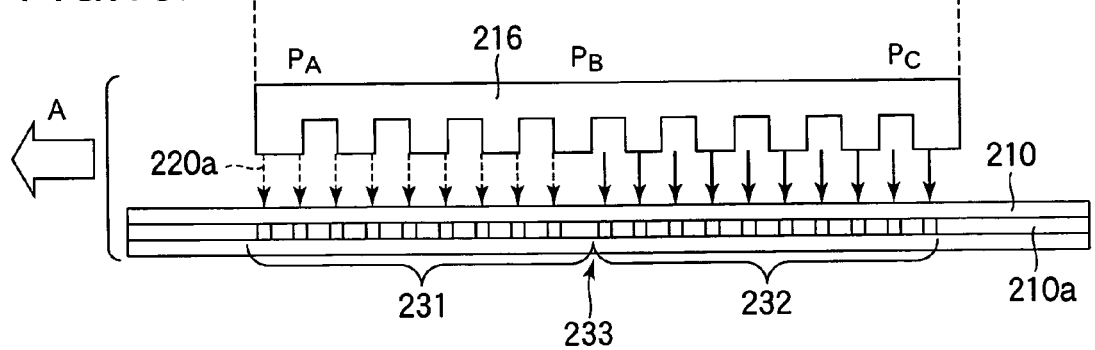

FIGS. 13A and 13B are diagrams showing the method of manufacturing the FBG. FIG. 13A shows the process of forming a refractive index modulation structure before the shift of the phase mask 216, and FIG. 13B shows the process of forming a refractive index modulation structure after the shift of the phase mask 216. When the ultraviolet laser light 220 passes through the phase mask 216 as shown in FIGS. 13A and 13B, an interference fringe (interference light 220a) having ½ the period of the diffraction grating of the phase mask 216, occurs. If this interference fringe is irradiated to the optical fiber core 210a, the refractive index of the optical fiber core 210a will increase according to the irradiation light amount, and a Bragg diffraction grating due to a periodic refractive index modulation structure will be formed in the optical fiber core 210a.

As shown in FIGS. 11A, 11B, and FIGS. 13A, 13B, due to displacement of the base plate 211 in the X-axis direction by the X-axis displacement stage 212c, i.e., due to displacement in the direction of the arrow 'A' shown in FIGS. 13A and 13B, the irradiation position of the ultraviolet laser light 220 is moved from a position $P_A$ via a position $P_B$ to a position $P_C$. When the irradiation position of the ultraviolet laser light 220 has reached the position $P_B$, the phase mask 216 is moved (slightly displaced) by a predetermined distance in the X-axis direction (in this example, in a direction opposite to the direction of the arrow 'A'), which is the longitudinal direction of the optical fiber 210, by the slight displacement stage 214. The travel distance of the phase mask 216 at this time is ¼ the period of the diffraction grating of the phase mask 216 (i.e., ½ the period of the Bragg diffraction grating formed in the optical fiber core 210a).

As shown in FIGS. 13A and 13B, a Bragg diffraction grating 231 is formed in the optical fiber core 210a due to the scanning of the ultraviolet laser light 220 from position $P_A$ to position $P_B$. The scanning rate of the ultraviolet laser light 220 at this time is a fixed value set within the range of, for example, 10 μm/s–100 μm/s. The relative positions of the phase mask 216 and optical fiber 210 do not change during this scan.

Figure 14:
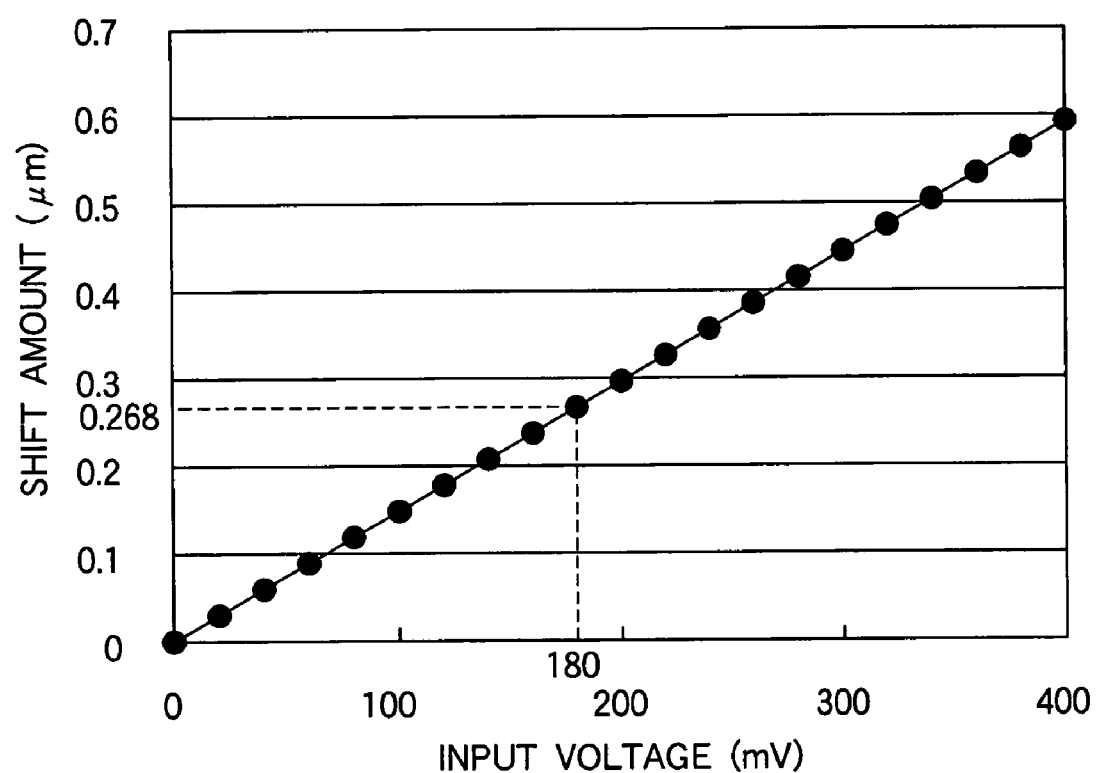
FIG. 14 is a diagram showing a relation between an input voltage of a piezo-electric element and a shift amount of the slight displacement stage.

As shown in FIG. 13B, due to the slight displacement by the slight displacement stage 214 when the irradiation position of the ultraviolet laser light 220 arrives at position $P_B$, a phase shift section 233 is formed in the optical fiber core 210a. The slight displacement amount (shift amount) at this time is ½ the period of the Bragg diffraction grating of the optical fiber core 210a (¼ the period of the diffraction grating of the phase mask 16), and this shift amount is the length of the phase shift section. This shift amount may, for example, be 0.268 μm. At this time, the input voltage to the piezo-electric element of the slight displacement stage 214 using the piezo-electric element is approximately 180 mV. The input voltage may be calculated from the relation between the input voltage of the piezo-electric element of the slight displacement stage and the shift amount as shown in FIG. 14. However, the relation of FIG. 14 is only an example, and the relation between the input voltage of the piezo-electric element and the shift amount will vary according to the kind of piezo-electric element.

As shown in FIG. 13B, the Bragg diffraction grating 232 is formed in the optical fiber core 210a due to scanning of the ultraviolet laser light 220 from position $P_B$ to position $P_C$. The scanning rate of the ultraviolet laser light 220 at this time is a fixed value set within the range of, for example, 10 μm/s–100 μm/s. The relative positions of the phase mask 16 and optical fiber 10 do not change during this scan. The irradiation position of the ultraviolet laser light 220 is fixed, the optical fiber 210 is displaced in the direction of the arrow 'A' by an X-axis displacement stage 12c, and the phase mask 16 is slightly displaced in the X-axis direction by the slight displacement stage 14. However, in FIGS. 13A and 13B, it is indicated that the position of the ultraviolet laser light 220 is moved in order to facilitate understanding of the spatial relationship of the phase mask 216 and optical fiber core 210a in the X-axis direction.

Due to the above process, the Bragg diffraction grating 231 from position $P_A$ to position $P_B$, and the Bragg diffraction grating 232 from position $P_B$ to position $P_C$, form an FBG which has a phase shift of ½ the period of a Bragg diffraction grating with the position $P_B$ in the optical fiber core 210a as boundary.

In the aforesaid description, a method of manufacturing an FBG with one phase shift section 233 was shown, but an FBG with plural phase shift sections can be manufactured by repeating the slight displacement of the phase mask 216 by the slight displacement stage 214. If the operation of the X-axis displacement stage 212c and slight displacement stage 214 is controlled by the same personal computer and the slight displacement stage 214 is operated with plural desired coordinates during operation of the X-axis displacement stage 212c, plural phase shift sections 233 can also be formed at desired positions. By selecting arbitrary code lengths and patterns, an OCDM encoder and decoder using SS-FBG have the plural phase shift sections 233 in the Bragg diffraction grating, and this FBG manufacturing method is suitable for manufacturing such an FBG.

By adjusting the input voltage of the slight displacement stage 214, the phase shift amount can be controlled, and an FBG having a phase shift section with an arbitrary shift amount, such as ¼ period or ¾ period of the Bragg diffraction grating, can be formed in the optical fiber core. In general, the phase shift amount is a value smaller than ½ period of the diffraction grating of the phase mask 216 (i.e., a value smaller than the period of the Bragg diffraction grating formed in the optical fiber core 210a). If necessary, the phase shift amount may be a value larger than ½ period of the phase mask diffraction grating (i.e., a larger value than the period of the Bragg diffraction grating formed in the optical fiber core 210a).

Figure 15:
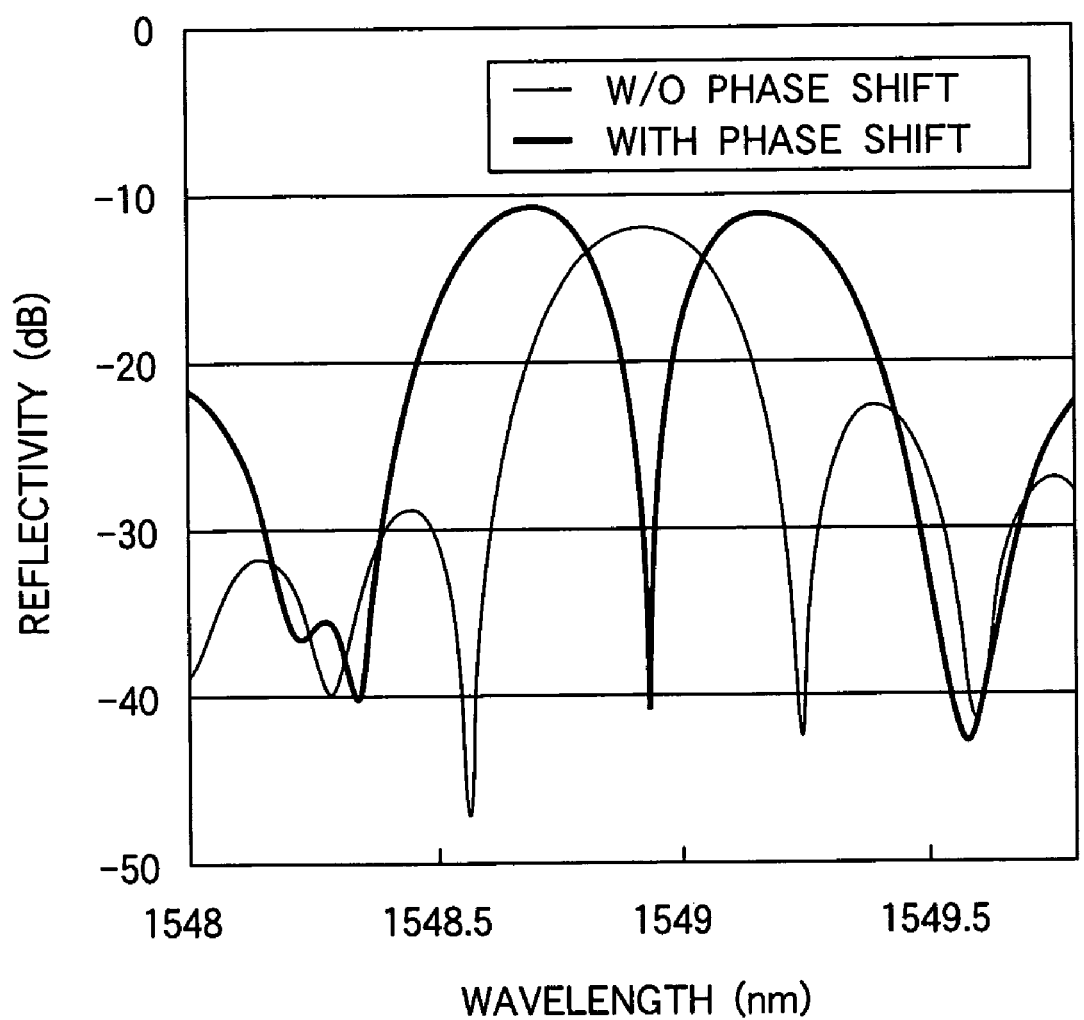
FIG. 15 is a diagram showing a reflection spectrum of an FBG with a phase shift section, and a reflection spectrum of an FBG without a phase shift section (comparative example)

FIG. 15 is a diagram showing the reflection spectrum of an FBG with a phase shift section, and the reflection spectrum of an FBG without a phase shift section (comparative example). As shown by the thick line (with phase shift) in FIG. 15, the reflection spectrum of the FBG having a phase shift section 33 with ½ period of the Bragg diffraction grating in the center of the FBG length has a dip in the center of the reflection bandwidth. The FBG length in this case is 2.4 mm, and the phase shift section is provided at its center (position 1.2 mm from end). As shown by the thin line (W/O phase shift) in FIG. 15, in the reflection spectrum without a phase shift section of the FBG, a dip does not appear in the center of the reflection bandwidth. In this example, from actual measurement data for such a reflection spectrum, it can be seen that a phase shift section with a length of ½ period of the Bragg diffraction grating is well-formed in the FBG.

If the above FBG manufacturing method or manufacturing device is used, a Bragg diffraction grating having a phase shift section 233 with a desired phase shift amount can be formed at any desired position of the optical fiber core 210a without replacing the phase mask 216.

Figure 16:
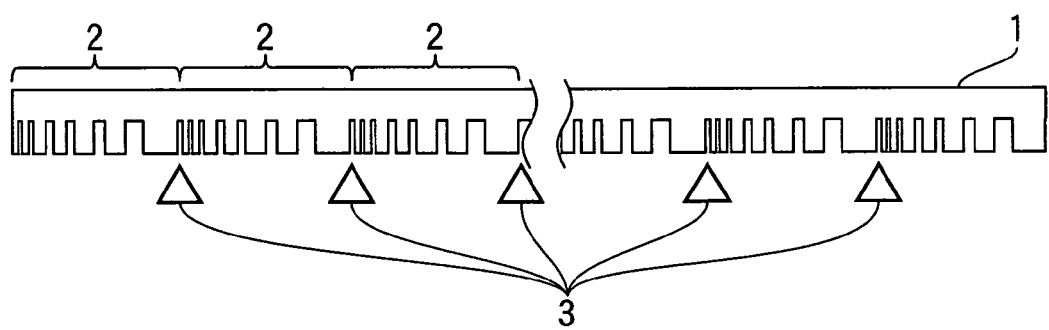
FIG. 16 is a diagram schematically showing the construction of the phase mask used for manufacture of an FBG with a phase shift section (first embodiment)

When manufacturing an FBG having the phase shift section described in the first embodiment, the phase mask 1 shown in FIG. 16 is used. The phase mask 1 shown in FIG.

16 has a structure wherein 15 unit diffraction gratings 2 are continuously connected (in FIG. 16, the central part is omitted). These unit diffraction gratings 2 have mutually identical construction. The length of the unit diffraction grating 2 is 2.4 mm, the grating period of the center of the unit diffraction grating 2 is approximately 1080 nm, and the unit diffraction grating 2 has a chirp amount of 0.8 nm converted to the reflected wavelength of the FBG. The positional relationship between the unit diffraction gratings 2 is such that the phases of the diffraction grating periods of the center of each unit are aligned in the longitudinal direction.

In manufacturing the FBG of the first embodiment, the Bragg diffraction grating is formed in the optical fiber core by irradiating the interference light of the ultraviolet laser produced by passage via the phase mask 1, while scanning with the ultraviolet laser. At this time, when the ultraviolet laser irradiates the boundaries between the unit diffraction gratings of this phase mask 1 (positions shown by the triangular marks in FIG. 16), a phase shift section (symbol 116 in FIGS. 1A and 1B) is formed by slightly displacing this phase mask 1 instantaneously. When manufacturing an OCDM encoder or decoder of the first embodiment, and the ultraviolet laser irradiates the boundaries between the unit diffraction gratings 2 of this phase mask 1 (positions shown by the triangular marks in FIG. 16), an FBG having a phase shift section can be produced by displacing this phase mask by ¼ period of the unit diffraction grating center, or not displacing it.

(3-2) Method of Manufacturing an FBG with Apodization Second Embodiment

In the following FBG manufacturing method, the phase mask is vibrated by applying a desired voltage amplitude of a function waveform to the piezo-electric element of the slight displacement stage, using a function voltage signal generator for driving the slight displacement stage. The refractive index modulation amplitude of the optical fiber core is made to fluctuate due to the vibration of the phase mask by the slight displacement stage, for example, an apodization is given to the amplitude.

The FBG manufacturing method shown in FIGS. 11A and 11B includes a step wherein the ultraviolet laser light 220 is scanned in the longitudinal direction (X-axis direction) of the optical fiber 210 by the phase mask technique to form a periodic refractive index modulation structure in the longitudinal direction of the optical fiber 210 in the optical fiber core 210a. This FBG manufacturing method includes a step wherein, parallel to the aforesaid step for scanning by the ultraviolet laser light 220, the phase mask 216 used in the phase mask technique is vibrated in the longitudinal direction of the optical fiber 210, and the amplitude of the refractive index modulation formed in the optical fiber core 210a is varied by continuously increasing or decreasing the amplitude of this vibration according to the irradiation position of the ultraviolet laser light 210.

Figure 17A:
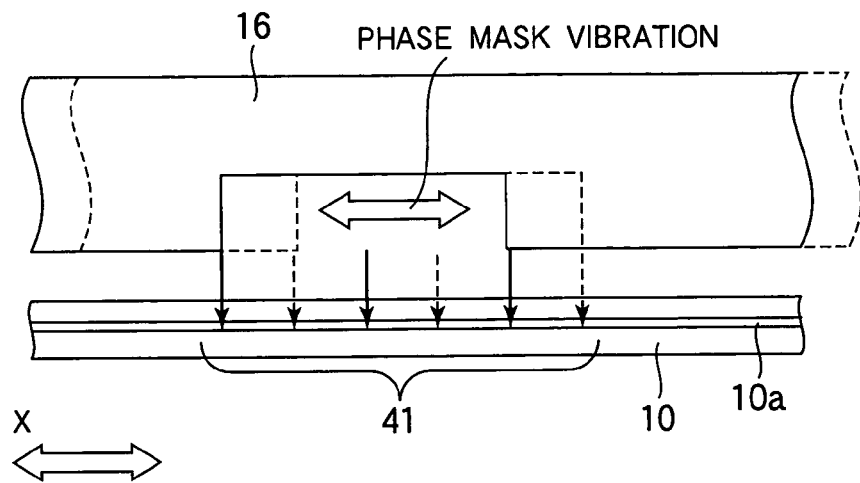
Figure 17B:
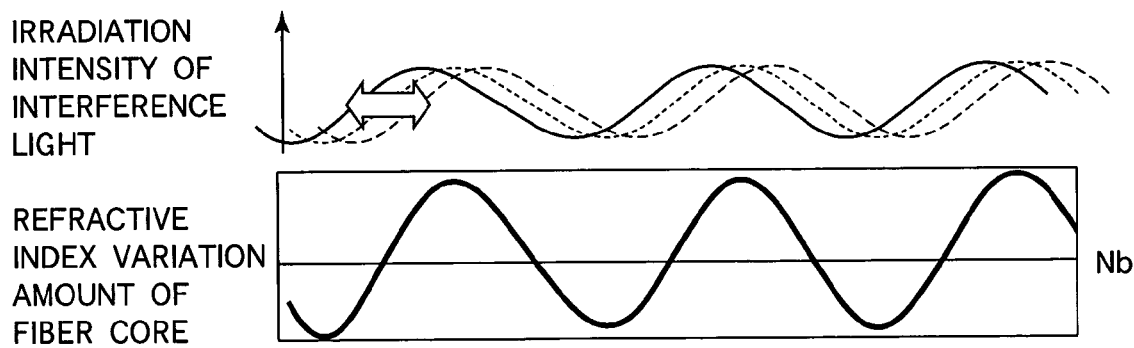
Figure 17C:
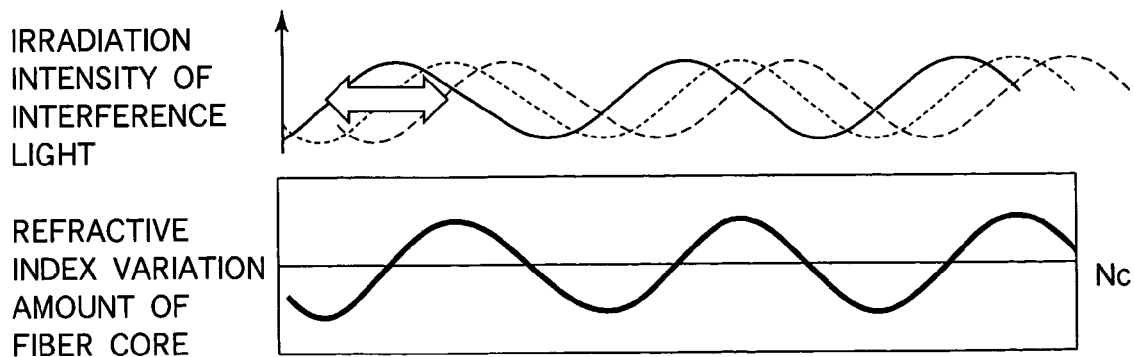

FIGS. 17A to 17C are diagrams showing the FBG manufacturing method. FIG. 17A shows the vibration of the phase mask, FIG. 17B shows that the refractive index modulation amplitude of the optical fiber core becomes large when the vibration amplitude of the phase mask is small, and FIG. 17C shows that the refractive index modulation amplitude of the optical fiber core becomes small when the vibration amplitude of the phase mask is large. As shown in FIG. 17A, if the phase mask 216 is repeatedly displaced (i.e., vibrated) between the solid line position and dashed line position, the irradiation position of the interference light 241 to the optical fiber core 210a will also change. When the laser beam dose of the optical fiber core 210a is constant, as shown in FIG. 17B, when the vibration amplitude of the phase mask 216 is small, the irradiation area of the interference light 241 on the optical fiber core 210a is narrow, so the refractive index modulation amplitude of the Bragg diffraction grating of the optical fiber core 210a becomes large. The vibration amplitude of the phase mask 216 corresponds to the phase difference between the solid line and thick dashed line among the three curves (solid line, thin dashed line and thick dashed line) which show the irradiation intensity of the interference light of FIG. 17B. When the vibration amplitude of the phase mask 216 is large, as shown in FIG. 17C, the irradiation area of the interference light 241 on the optical fiber core 210a is wide, so the refractive index modulation amplitude of the Bragg diffraction grating of the optical fiber core 210a becomes small. The vibration amplitude of the phase mask 216 corresponds to the phase difference between the solid line and thick dashed line among the three curves (solid line, thin dashed line and thick dashed line) which show the irradiation intensity of the interference light of FIG. 17C. The average refractive index variation amount Nb in the case of FIG. 17B and the average refractive index variation amount Nc in the case of FIG. 17C are equal.

Figure 18:
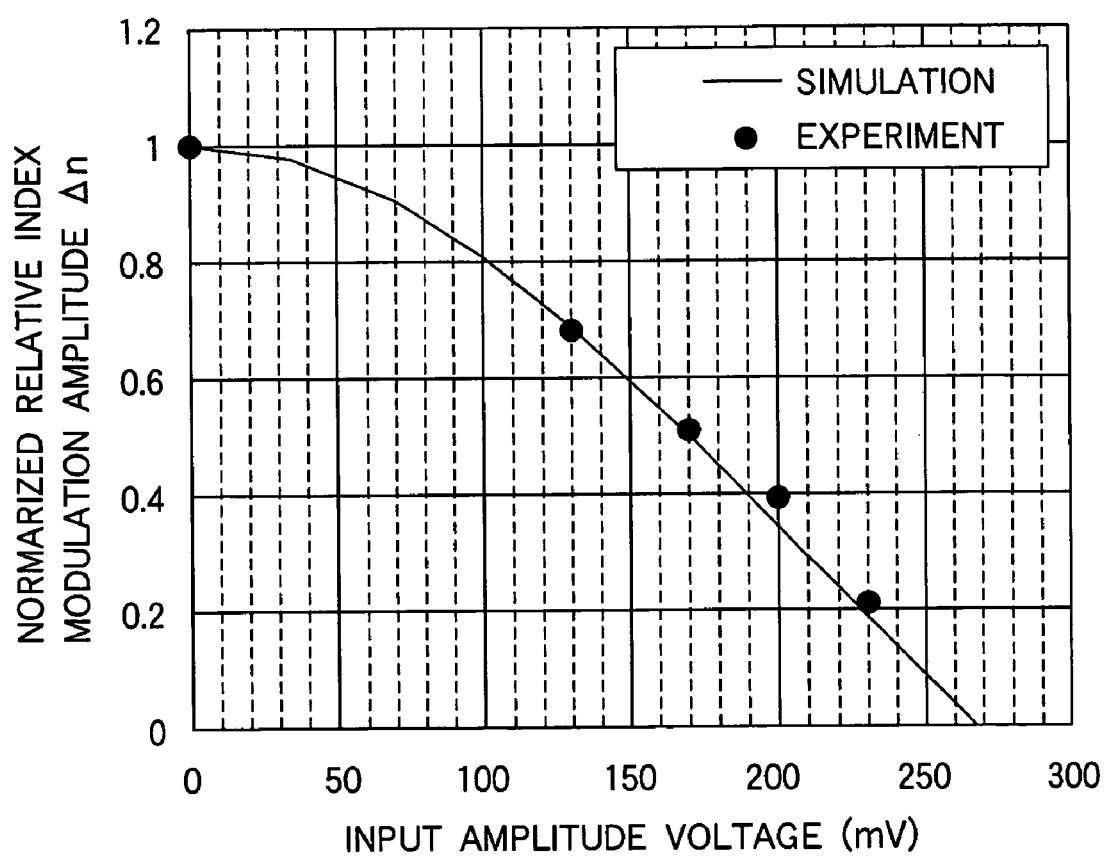
FIG. 18 is a diagram showing a normalized relative refractive index modulation amplitude when the vibration of the piezoelectric element of the slight displacement stage of the FBG manufacturing device is a sine function.

FIG. 18 is a diagram showing the normalized relative refractive index modulation amplitude when the vibration of the piezo-electric element of the slight displacement stage of the FBG manufacturing device is a sine function. This normalization sets the refractive index modulation amplitude of the Bragg diffraction grating of the optical fiber core 210a to 1 when the input amplitude voltage of the sine function is 0 mV. Also, this graph shows the relation between simulation and measurement when the vibration function is a sine wave (or cosine wave). The vibration frequency at this time was 10 Hz. It is seen that, when control is performed by the amplitude of a sine wave (or cosine wave) function, the simulation and experimental values effectively coincide.

Figure 19A:
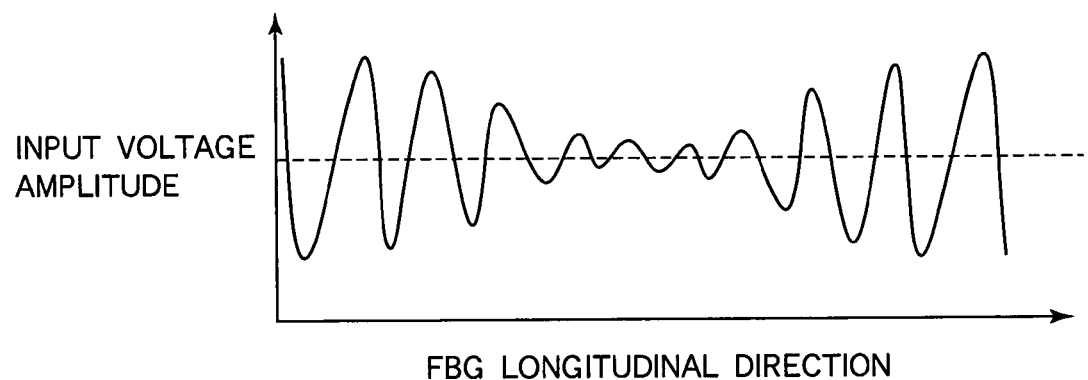
Figure 19B:
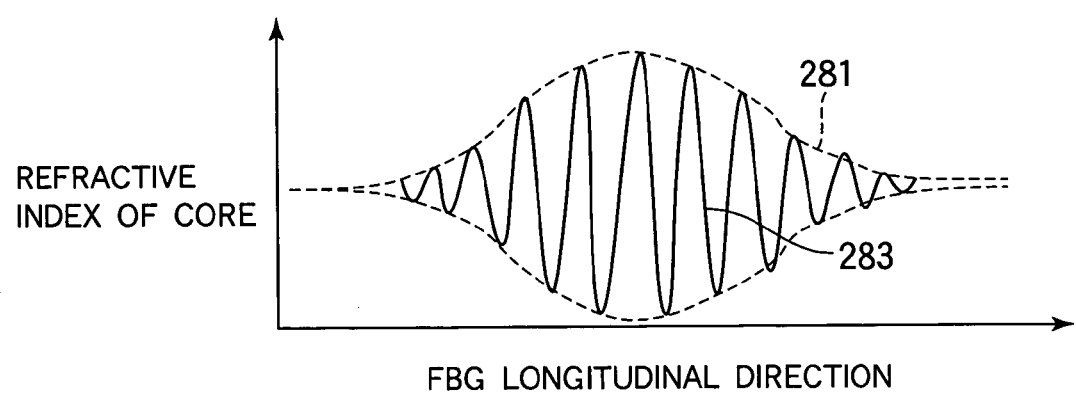

FIGS. 19A and 19B are diagrams for describing how to form an apodization. FIG. 19A shows an input voltage waveform of the piezo-electric element of the slight displacement stage, and FIG. 19B shows the refractive index modulation amplitude of the optical fiber core. Apodization is a technique which makes the envelope of the periodic refractive index modulation of the FBG the shape shown in FIG. 19B (bell shape), and suppresses the Fabry-Perot side lobes at the two ends of the FBG. To form a Bragg diffraction grating wherein an envelope 281 of a periodic refractive index modulation 283 of an FBG is the shape shown in FIG. 19B, the voltage amplitude of the input sine wave (or cosine wave) function relative to the position in the FBG longitudinal direction, should be as shown in FIG. 19A. The voltage amplitude required to obtain the envelope 281 can be obtained from the relation of the normalized refractive index modulation amplitude of the diffraction grating of the optical fiber core to the input amplitude voltage of the sine function shown in FIG. 18. Therefore, the apodization can be formed in the Bragg diffraction grating of the optical fiber core by controlling the input voltage of the piezo-electric element.

Figure 20:
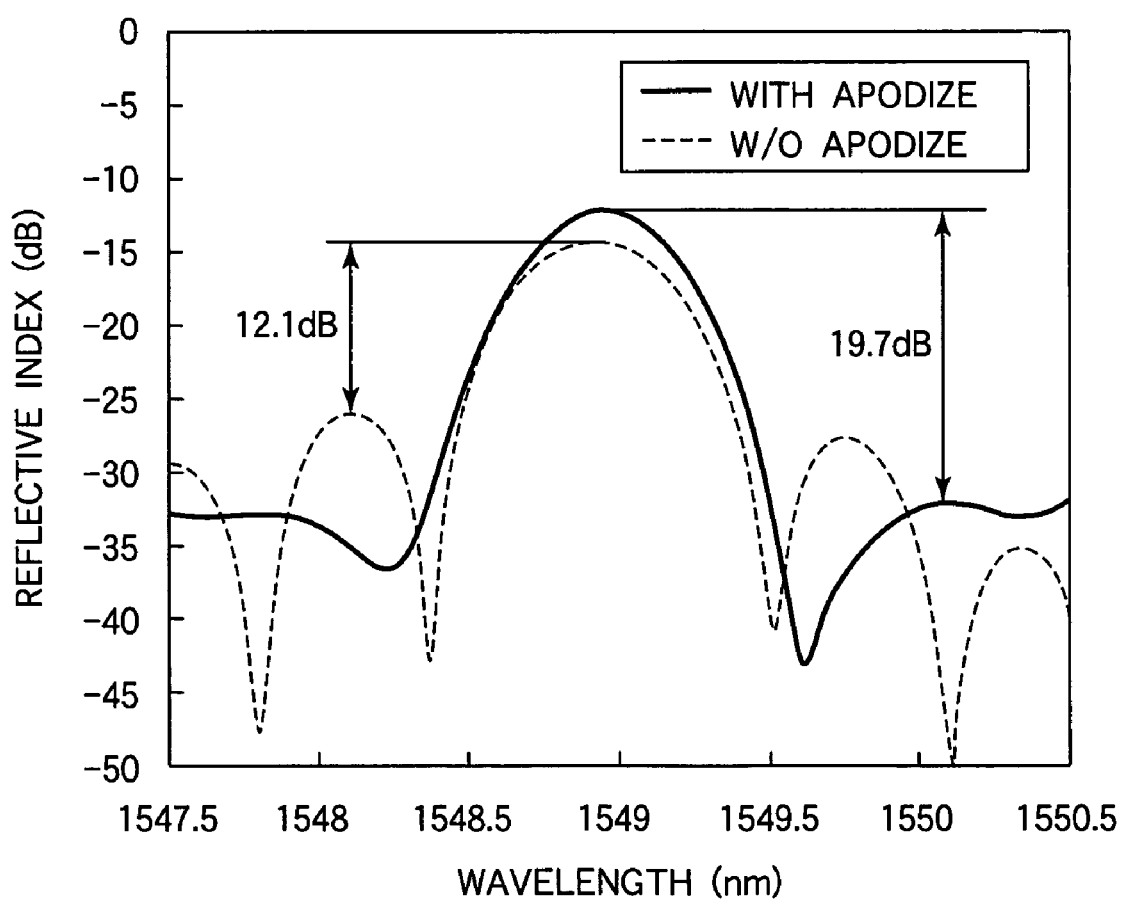
FIG. 20 is a diagram showing the reflection spectrum of an FBG with apodization, and the reflection spectrum of an FBG without apodization (comparative example)

FIG. 20 is a diagram showing the reflection spectrum of an FBG with apodization, and the reflection spectrum of an FBG without apodization (comparative example).

The length of these FBG is 4.8 mm. Here, the envelope of the apodized refractive index modulation (i.e., having an apodization) is formed by the raised cosine function of equation (4):

$$f(x)=1+\cos(2\pi x/L_0) \qquad (4)$$

where $L_0$ is the full length of the FBG. Comparing the reflection spectrum of the FBG with apodization shown as a solid line (with apodization) in FIG. 20, and the reflection spectrum of the FBG without apodization shown as a dashed line (W/O apodization) in FIG. 20, it is seen that in the FBG with apodization, the side lobes are suppressed. In the above description, although a raised cosine function was used for apodization, other functions may also be used.

Using the above FBG manufacturing method or manufacturing device, a fluctuation (e.g., apodization) of the refractive index modulation amplitude can be formed at any desired position of the optical fiber core 210a.

In the FBG manufacturing method or manufacturing device, since the phase mask 216 is vibrated in the longitudinal direction in order to form a fluctuation of the refractive index modulation amplitude, the spatial relationship of the ultraviolet laser light 220 and optical fiber core 210a in the Y-axis direction does not shift. Also, the width in the Y-axis direction of the phase mask 16 is as large as approximately 5 mm–10 mm, so there is no change of the dose of ultraviolet laser light to the optical fiber core 210a due to a shift of the phase mask 16 in the Y-axis direction. Therefore, if a Bragg diffraction grating is formed in the optical fiber core 210a using the above FBG manufacturing method or manufacturing device, dispersion in the refractive index modulation amplitude resulting from a shift of the optical fiber in the width direction can be made small.

Further, when the piezo-electric element is made to vibrate using the voltage applied to the piezo-electric element of the slight displacement stage 214 as a function voltage signal generator, if the amplitude is made to vibrate with a smooth sine wave (or cosine wave), the amplitude of the FBG refractive index modulation of a simulation and the amplitude of the refractive index modulation of an FBG which was actually produced, effectively coincide. Therefore, the refractive index modulation amplitude of the FBG which was actually manufactured can be converted into an input voltage of the piezo-electric element of the slight displacement stage 214, and the process design for obtaining a desired FBG refractive index modulation is facilitated.

(3-3) Method of Manufacturing an FBG with Apodization and a Phase Shift Section Second Embodiment In the method of manufacturing an FBG having both a phase shift section and a change of refractive index change amplitude, a signal obtained by combining the output of the direct current voltage generator and the output of the function voltage signal generator is input into the piezo-electric element of the slight displacement stage, and the phase mask 216 is thereby vibrated and slightly displaced.

This FBG manufacturing method includes a step wherein the ultraviolet laser light 220 is scanned in the longitudinal direction (X-axis direction) of the optical fiber 210 by the phase mask technique, and forms a periodic refractive index modulation structure in the longitudinal direction of the optical fiber 210 in the optical fiber core 210a. This FBG manufacturing method also includes a step wherein, parallel to the aforesaid step for scanning by the ultraviolet laser light 220, the phase mask 216 used in the phase mask technique is vibrated (slightly displaced) instantaneously by a predetermined distance in the longitudinal direction of the optical fiber 210, and the phase shift section 233 is thereby formed in the periodic refractive index modulation structure formed in the optical fiber core 210a. This FBG manufacturing method further includes a step wherein the phase mask 216 used in the phase mask technique is vibrated in the longitudinal direction of the optical fiber 210, and the vibration amplitude is continuously increased or decreased according to the irradiation position of the ultraviolet laser light 210 so as to vary the amplitude of the refractive index modulation formed in the optical fiber core 210a.

Figure 21A:
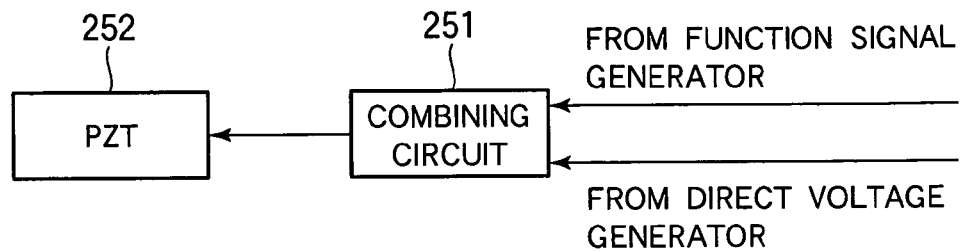
Figure 21B:
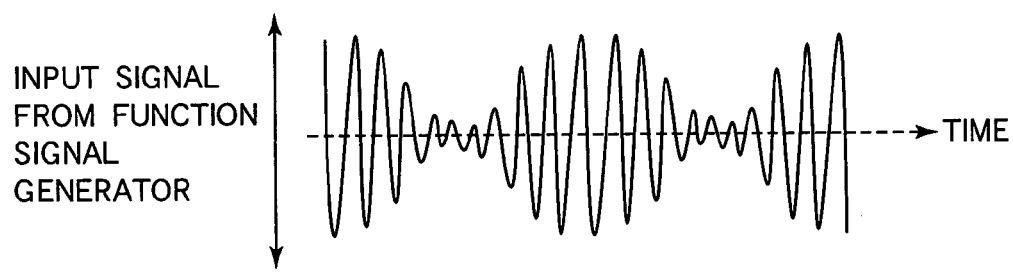
Figure 21C:
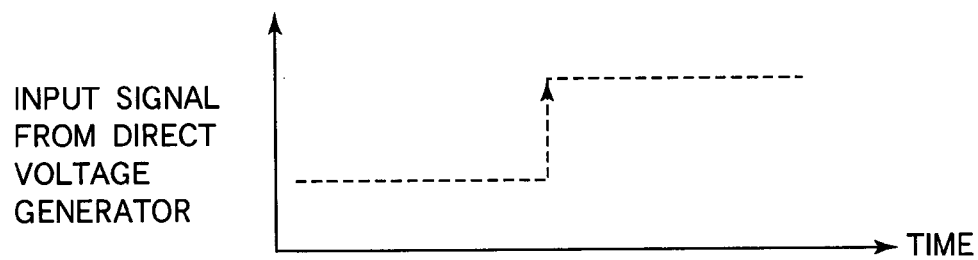
Figure 21D:
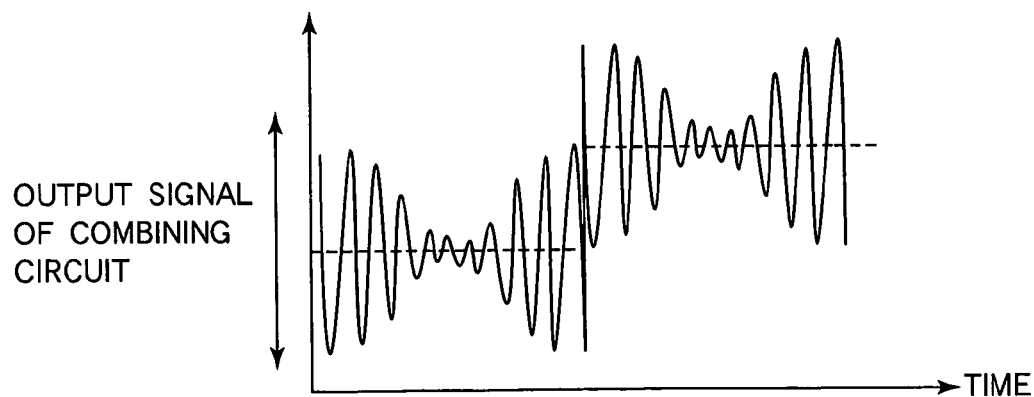

FIGS. 21A to 21D are diagrams for describing an FBG manufacturing method. FIG. 21A is a diagram showing the operation of a drive circuit (combining circuit) 251 of the piezo-electric element of the slight displacement stage, FIG. 21B shows an example of an input signal waveform from a function signal generator, FIG. 21C shows an example of an input voltage waveform from a direct current voltage generator, and FIG. 21D shows the output waveform of the combining circuit 251. As shown in FIG. 21A, the voltage amplitude of the function voltage signal generator and the direct current voltage of the direct current voltage generator are inputted into the combining circuit, and a combined voltage waveform is outputted.

A method will now be described of manufacturing an FBG having one phase shift section, and the FBG is further subjected to an apodization technique. The case is shown where the FBG length is 2.4 mm, it has a phase shift section having a length of ½ period of the Bragg diffraction grating in the center of the FBG length, and an apodization of a raised cosine function is given every 1.2 mm from the end of the FBG.

The FBG manufacturing method is as follows. In the manufacturing device shown in FIGS. 11A and 11B, when the X-axis displacement stage 212c is operated, the ultraviolet laser light 220 scans the optical fiber core 10a via the phase mask 216. Since the refractive index modulation amplitude is set to approximately 0 at the start of a scan as shown in FIG. 21D, the amplitude voltage inputted into the piezo-electric element is large, i.e., approximately 268 mV. In forming a Bragg diffraction grating of 1.2 mm length before phase shift formation, as shown in FIG. 21D, the input voltage amplitude is made to fluctuate from approximately 0 mV–268 mV by conversion from the raised cosine function, considering the refractive index modulation amplitude of the diffraction grating of the optical fiber core normalized relative to the input amplitude voltage of the sine function shown in FIG. 18, and taking the full length of the FBG as 1.2 mm. As shown in FIG. 21D, to form a phase shift section (268 μm) having a length of ½ period of the Bragg diffraction grating when the scanning distance is 1.2 mm, a direct current voltage of approximately 180 mV was applied. As shown in FIG. 21D, as for the input voltage amplitude for forming a Bragg diffraction grating of the remaining 1.2 mm length after scanning distance has exceeded 1.2 mm, the same input voltage amplitude change as the 1.2 mm scan before a phase shift was applied.

Figure 22A:
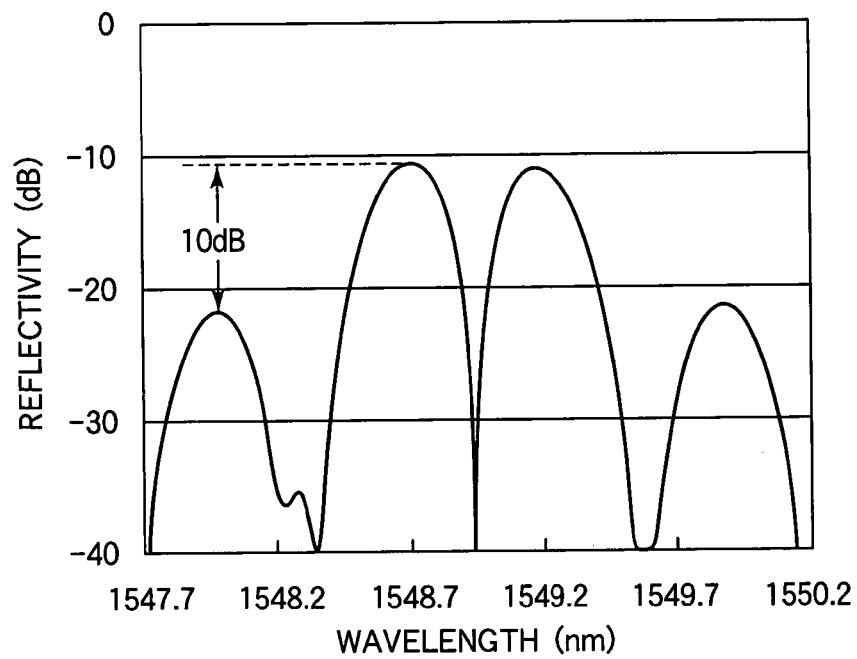
FIG. 22A is a diagram showing the reflection spectrum of an FBG having a phase shift section but not having apodization (comparative example)
Figure 22B:
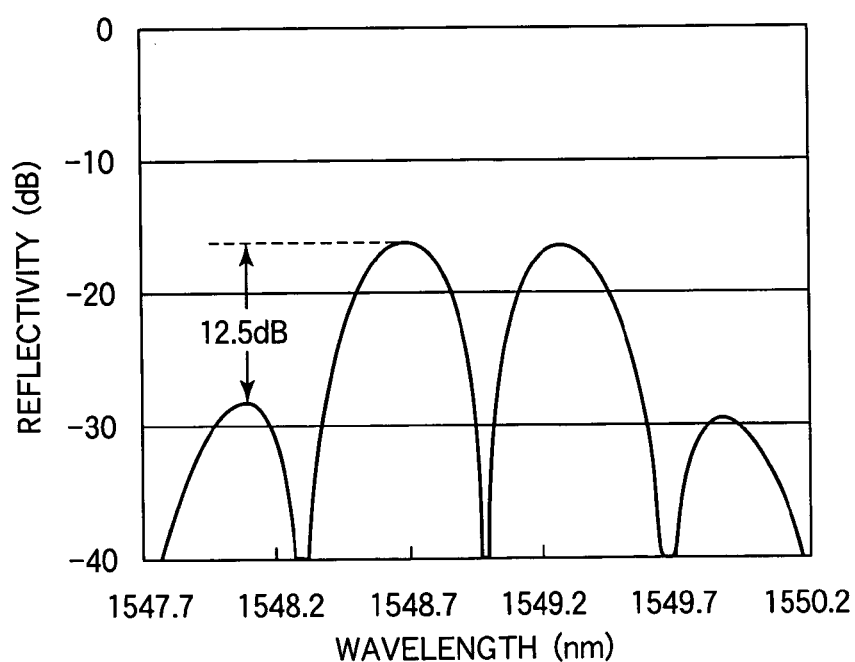
FIG. 22B is a diagram showing the reflection spectrum of an FBG having both a phase shift section and apodization.

FIG. 22A is a diagram showing a reflection spectrum of an FBG having a phase shift section but which does not have an apodization (comparative example), and FIG. 22B is a diagram showing the reflection spectrum of an FBG having both a phase shift section and apodization. FIGS. 22A and 22B show the reflection spectrum with apodization and without apodization in an FBG of 2.4 mm length having a phase shift section of length ½ period of the Bragg diffraction grating in the center of the FBG. It is seen that in the reflection spectrum of the FBG with apodization, the side lobes are suppressed.

In the aforesaid description, an example was shown where an FBG having one phase shift section and a raised cosine function for apodization, was manufactured. However, FBG can be manufactured by the same technique having plural phase shift sections and an arbitrary phase shift amount, and wherein an arbitrary function is used for apodization. Hence, by combining the voltage of the direct current voltage generator and the signal of the function voltage signal generator, and applying the result to the piezo-electric element of the slight displacement stage, an FBG wherein the slight displacement stage can be vibrated and shifted with a desired amount, number of phase shifts and an apodization of a desired function, can be formed.

Figure 23:
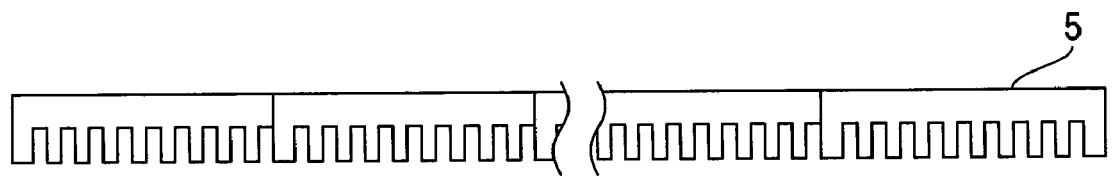
FIG. 23 is a diagram schematically showing the construction of the phase mask used for manufacture of an FBG with a phase shift section (second embodiment)
Figure 24:
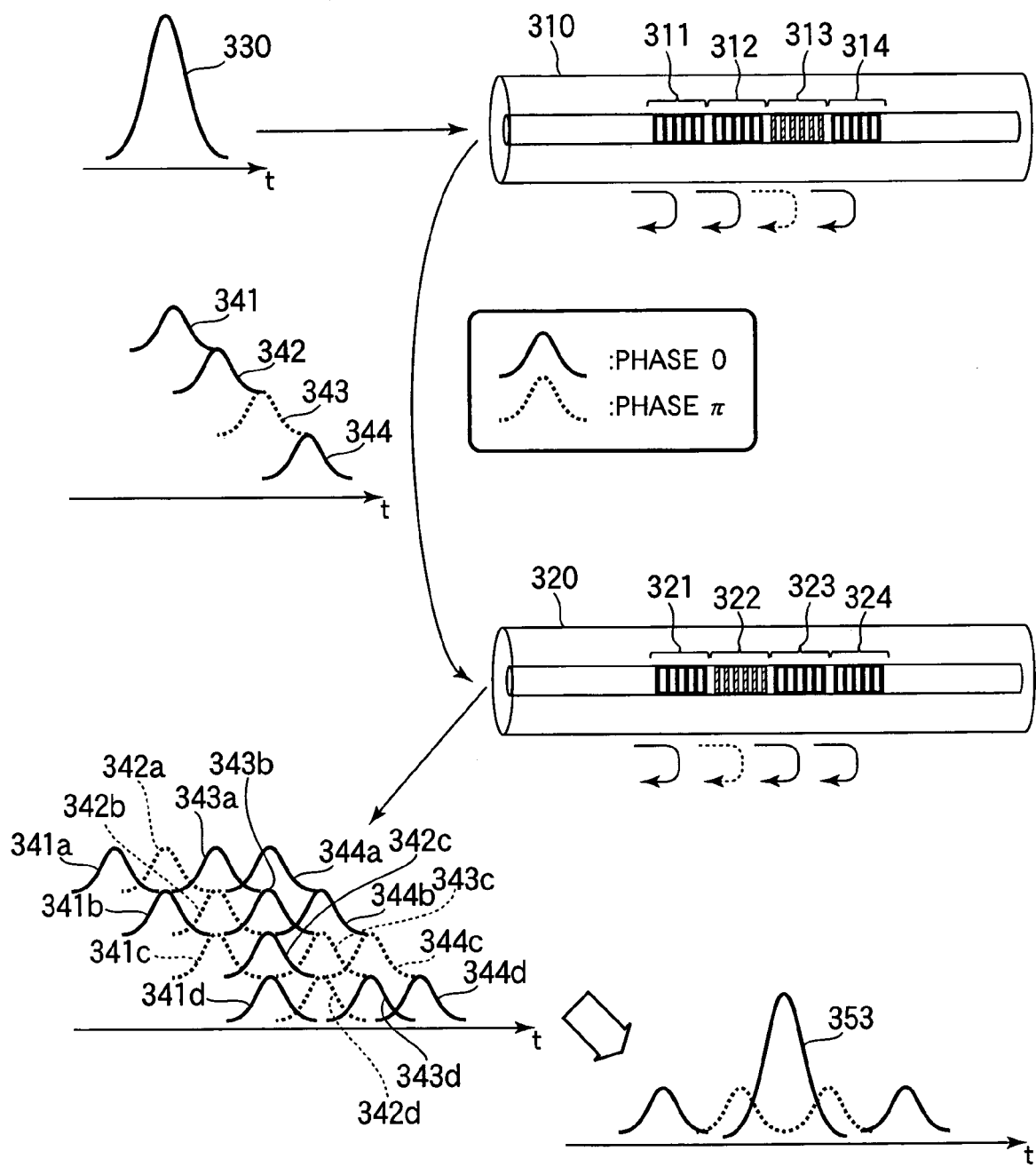
FIG. 24 is a diagram showing the principle of encoding by an FBG encoder, and decoding by an FBG decoder.

When manufacturing an FBG having a phase shift section described as the second embodiment, the phase mask 5 shown in FIG. 23 is used. The phase mask 5 shown in FIG. 23 has a diffraction grating section of length 36 mm or more, the period of the diffraction gratings is fixed at approximately 1080 nm in each part, and the phases are aligned.

When manufacturing the FBG of the second embodiment, a Bragg diffraction grating is formed in the optical fiber core by irradiating with the interference light of the ultraviolet laser produced by passage through the mask 5, while scanning with the ultraviolet laser. When a desired position irradiated by the ultraviolet laser is reached, a phase shift section (symbol 166 in FIGS. 6A and 6B) is formed at the desired position by slightly displacing this phase mask instantaneously. In manufacturing an OCDM encoder or decoder of the second embodiment, an FBG having a phase shift section is manufactured by displacing the phase mask by ¼ of the period of the center of the unit diffraction grating or not displacing it, according to the encoding, at a position with a 2.4 mm period from the ultraviolet laser irradiation start point.

In the second embodiment, the Gaussian function shown in equation (3) is used for apodization (window function). The refractive index modulation amplitude calculated with this function, and the input amplitude voltage calculated from the relation of the input amplitude voltage and the normalized relative refractive index modulation shown in FIG. 18, are input to the piezo-electric element of the slight displacement stage to vibrate the phase mask.

In the FBG manufacturing method or manufacturing device, the phase mask 216 is slightly displaced and vibrated in its longitudinal direction to form a change of the refractive index modulation amplitude, so the spatial relationship of the ultraviolet laser light 220 and optical fiber core 210a in the Y-axis direction does not shift as in the conventional technique which vibrates the optical fiber 210. Also, since the width of the phase mask 16 in the Y-axis direction is as large as approximately 5 mm–10 mm, there is no change in the dose of ultraviolet laser light irradiated to the optical fiber core 210a due to a shift of the phase mask 216 in the Y-axis direction. Therefore, if the Bragg diffraction grating is formed in the optical fiber core 210a using the FBG manufacturing method or manufacturing device, dispersion in the refractive index modulation amplitude resulting from a shift of the optical fiber in the width direction can be made small.

In the aforesaid embodiment of the invention, a Bragg diffraction grating was formed in an optical fiber core, but the refractive index modulation structure of the present invention may be used for any optical waveguide wherein a refractive index modulation can be applied by some means.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. An optical waveguide device including an optical waveguide, in which a Bragg reflection type refractive index modulation structure is formed;

the optical waveguide comprising:

plural unit diffraction grating sections respectively including a periodic refractive index modulation structure in a longitudinal direction of the optical waveguide and aligned in the longitudinal direction of the optical waveguide; and one or plural phase shift sections formed between any two adjacent unit diffraction grating sections among the plural unit diffraction grating sections, thereby producing a predetermined phase difference between the periodic refractive index modulation structures of the any two adjacent unit diffraction grating sections;

wherein a period of the periodic refractive index modulation structure of the plural unit diffraction grating sections gradually increases or decreases in the longitudinal direction of the optical waveguide.

2. The optical waveguide device according to claim 1, wherein the optical waveguide is an optical fiber, and the refractive index modulation structure is formed in a core of the optical fiber.

3. The optical waveguide device according to claim 1, wherein the plural unit diffraction grating sections have an identical refractive index modulation structure.

4. The optical waveguide device according to claim 1, wherein the optical waveguide device is any of an optical encoder and an optical decoder.

5. The optical waveguide device according to claim 1, wherein the predetermined phase difference in the phase shift section is π.

6. The optical waveguide device according to claim 1, wherein a variation amount of the refractive index modulation period of the unit diffraction grating sections, or a window function indicating the envelope of the refractive index modulation of the unit diffraction grating sections, is determined according to a pulse width of a light pulse input to the optical waveguide.

7. An optical waveguide device including an optical waveguide, in which a Bragg reflection type refractive index modulation structure is formed;

the optical waveguide comprising:

plural unit diffraction grating sections respectively including a periodic refractive index modulation structure in a longitudinal direction of the optical waveguide and aligned in the longitudinal direction of the optical waveguide; and one or plural phase shift sections formed between any two adjacent unit diffraction grating sections among the plural unit diffraction grating sections, thereby producing a predetermined phase difference between the periodic refractive index modulation structures of the any two adjacent unit diffraction grating sections;

wherein amplitude of the periodic refractive index modulation of the plural unit diffraction grating sections, the periodic refractive index modulation structure being drawn in a coordinate system including the longitudinal direction and refractive index of the optical waveguide as coordinate axes, is varied relative to the longitudinal direction of the optical waveguide so that an envelope of the periodic refractive index modulation is a predetermined window function.

8. The optical waveguide device according to claim 7, wherein the predetermined window function is any of a Gaussian function, a raised cosine function, a hyperbolic tangent function, a Blackman function, a Hamming function and a Hanning function.

9. The optical waveguide device according to claim 7, wherein the optical waveguide is an optical fiber, and the refractive index modulation structure is formed in a core of the optical fiber.

10. The optical waveguide device according to claim 7, wherein the plural unit diffraction grating sections have an identical refractive index modulation structure.

11. The optical waveguide device according to claim 7, wherein the optical waveguide device is any of an optical encoder and an optical decoder.

12. The optical waveguide device according to claim 7, wherein the predetermined phase difference in the phase shift section is $\pi$.

13. The optical waveguide device according to claim 7, wherein a variation amount of the refractive index modulation period of the unit diffraction grating sections, or a window function indicating the envelope of the refractive index modulation of the unit diffraction grating sections, is determined according to a pulse width of a light pulse input to the optical waveguide.

* * * * *